US011371550B2

(12) United States Patent
Yu et al.

(10) Patent No.: US 11,371,550 B2
(45) Date of Patent: Jun. 28, 2022

(54) ROTARY ENGINE

(71) Applicant: LG Electronics Inc., Seoul (KR)

(72) Inventors: Byeonghun Yu, Seoul (KR); Wheesung Oh, Seoul (KR); Yunhi Lee, Seoul (KR); Gun Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 16/764,163

(22) PCT Filed: Nov. 13, 2018

(86) PCT No.: PCT/KR2018/013851
§ 371 (c)(1),
(2) Date: Oct. 28, 2020

(87) PCT Pub. No.: WO2019/098655
PCT Pub. Date: May 23, 2019

(65) Prior Publication Data
US 2021/0054872 A1 Feb. 25, 2021

(30) Foreign Application Priority Data

Nov. 14, 2017 (KR) .................. 10-2017-0151844
Nov. 14, 2017 (KR) .................. 10-2017-0151845
Nov. 14, 2017 (KR) .................. 10-2017-0151846

(51) Int. Cl.
*F16C 3/18* (2006.01)
*F02B 55/08* (2006.01)
(Continued)

(52) U.S. Cl.
CPC ............... *F16C 3/18* (2013.01); *F01C 21/08* (2013.01); *F01C 21/10* (2013.01); *F02B 55/08* (2013.01);
(Continued)

(58) Field of Classification Search
CPC ...... F16C 3/18; F16C 3/10; F16C 3/20; F16C 3/12; F16C 2360/22; F01C 21/08;
(Continued)

(56) References Cited

U.S. PATENT DOCUMENTS 3,872,838 A * 3/1975 Vogelsang .............. F01C 19/04
418/187
3,985,476 A * 10/1976 Hofbauer ................ F02B 53/06
418/61.3
(Continued)

FOREIGN PATENT DOCUMENTS

JP     2005325813    11/2005
JP     2017160796     9/2017
(Continued)

*Primary Examiner* — J. Todd Newton
(74) *Attorney, Agent, or Firm* — Fish & Richardson P.C.

(57) ABSTRACT

The present invention provides a rotary engine comprising: a housing provided with three lobe accommodation parts; a rotor which is provided with two lobes continuously accommodated in the lobe accommodation parts, has an intake storage part communicating with an intake port provided on the front surface-side, and has an exhaust storage part communicating with an exhaust port provided on the rear surface-side; an intake-side housing cover provided with an intake hole communicating with the intake storage part; an exhaust-side housing cover provided with an exhaust hole communicating with the exhaust storage part; and a crankshaft, wherein the flow of an exhaust gas into a stroke chamber during an intake stroke is reduced by preventing the exhaust storage part, at a portion of a section in which the exhaust port is open, from communicating with the exhaust hole during the intake stroke.

21 Claims, 35 Drawing Sheets

(51) Int. Cl.
*F02B 55/16* (2006.01)
*F01C 21/08* (2006.01)
*F01C 21/10* (2006.01)
*F02B 53/00* (2006.01)
*F16C 3/10* (2006.01)
*F16C 3/20* (2006.01)

(52) U.S. Cl.
CPC ............... *F02B 55/16* (2013.01); *F16C 3/10* (2013.01); *F16C 3/20* (2013.01); *F02B 2053/005* (2013.01)

(58) Field of Classification Search
CPC .......... F01C 21/10; F01C 1/063; F01C 19/02; F02B 55/08; F02B 55/16; F02B 2053/005
USPC ............... 123/18 A, 18 R, 43 A, 45 A, 45 R, 123/200–249; 418/140, 187, 61.1
See application file for complete search history.

(56) References Cited

U.S. PATENT DOCUMENTS

| | | | |
|---|---|---|---|
| 4,083,663 A * | 4/1978 | Montalvo | F01C 1/36 418/183 |
| 8,523,546 B2 * | 9/2013 | Shkolnik | F01C 19/085 418/61.2 |
| 9,528,435 B2 * | 12/2016 | Shkolnik | F02B 53/10 |
| 9,810,068 B2 * | 11/2017 | Shkolnik | F01C 21/04 |
| 10,087,758 B2 * | 10/2018 | Montie | F01C 1/22 |
| 10,774,646 B2 * | 9/2020 | Lee | F01M 1/06 |
| 2002/0028151 A1 * | 3/2002 | Manner | F01C 1/22 418/61.2 |
| 2014/0209056 A1 * | 7/2014 | Shkolnik | F01C 21/06 123/241 |
| 2017/0184016 A1 * | 6/2017 | Yu | F01C 19/025 |
| 2017/0218956 A1 * | 8/2017 | Lee | F04C 29/0085 |
| 2018/0283175 A1 * | 10/2018 | Lee | F01M 1/02 |
| 2018/0334955 A1 * | 11/2018 | Lee | F01C 1/10 |
| 2021/0003011 A1 * | 1/2021 | Yu | F01C 21/045 |
| 2021/0054872 A1 * | 2/2021 | Yu | F16C 3/12 |

FOREIGN PATENT DOCUMENTS

| | | |
|---|---|---|
| KR | 100395080 | 11/2003 |
| KR | 100528831 | 11/2005 |
| KR | 20170075581 | 7/2017 |
| KR | 20180127848 | 11/2018 |

* cited by examiner

[ROTATION ANGLE OF ROTOR 5°]
[ROTATION ANGLE OF CRANKSHAFT 10°]

[ROTATION ANGLE OF ROTOR 30°]
[ROTATION ANGLE OF CRANKSHAFT 60°]

[ROTATION ANGLE OF ROTOR 45°]
[ROTATION ANGLE OF CRANKSHAFT 90°]

[ROTATION ANGLE OF ROTOR 45°]
[ROTATION ANGLE OF CRANKSHAFT 90°]

[ROTATION ANGLE OF ROTOR 345°]
[ROTATION ANGLE OF CRANKSHAFT 690°]

[ROTATION ANGLE OF ROTOR 360°]
[ROTATION ANGLE OF CRANKSHAFT 720°]

[ROTATION ANGLE OF ROTOR 360°]
[ROTATION ANGLE OF CRANKSHAFT 720°]

ROTARY ENGINE

CROSS-REFERENCE TO RELATED APPLICATIONS

This application is a National Stage application under 35 U.S.C. § 371 of International Application No. PCT/KR2018/013851, filed on Nov. 13, 2018, which claims the benefit of Korean Patent Application No. 10-2017-0151844, filed on Nov. 14, 2017, Korean Application No. 10-2017-0151845, filed on Nov. 14, 2017 and Korean Application No. 10-2017-0151846, filed on Nov. 14, 2017. The disclosures of the prior applications are incorporated by reference in their entirety.

TECHNICAL FIELD

The present invention relates to a multi-cylinder rotary engine.

BACKGROUND ART

A rotary engine is an engine which produces power by rotating motion, and was first devised by Wankel.

The engine devised by Wankel includes a housing of which an inner surface is formed in an epitrochoidal curve, and a triangular rotor which rotates in the housing.

An inner space in the housing is divided into three spaces by the rotor, and volumes of the spaces are changed according to the rotation of the rotor, and thus four strokes of intake→compression→combustion/expansion→exhaust continuously occur.

After a Wankel engine was devised, various studies for design optimization of the Wankel engine have been performed, and a modified rotary engine has been also developed.

The rotary engine is a high-power engine easy to be downsized and capable of generating high power in high-speed driving due to a simple structure. Due to the features, the rotary engine has an advantage of being applicable to various devices such as a heat pump system, an automobile, a bicycle, an aircraft, a jet ski, a chain saw, a drone, and the like.

Unlike a reciprocating engine, the rotary engine has a structure without an on-off valve. Further, an intake port and an exhaust port which serve as valves are provided in a sidewall of the rotor instead of a valve.

Each of the spaces in the housing divided by the rotor is required to maintain sealing with the outside of the rotary engine or with other spaces. To this end, a side seal, an apex seal, and a button seal are usually provided on surfaces where the housing and the rotor rub against each other.

The side seal is mounted on the rotor to rotate with the rotor, and the apex seal and the button seal are formed to be fixed to the housing forming a frictional surface with the rotor.

The sidewall of the rotor is provided with an intake port which suctions mixed air and an exhaust port which discharges exhaust gas after combustion.

The sidewall of the rotor rotates while maintaining a contact state with the apex seal disposed in the housing.

However, when the rotor and the apex seal are thermally deformed due to heat generated by combustion, interference between the intake port or the exhaust port provided in the sidewall of the rotor and the apex seal may occur, and thus the rotor and the apex seal may be damaged.

When the intake port provided in the sidewall of the rotor is spaced apart from an inner wall of the housing, an intake valve is in an open state, and thus mixed air is suctioned into the housing through the intake port.

Further, when the exhaust port provided in the sidewall of the rotor is spaced apart from the inner wall of the housing, the exhaust valve is in an open state, and thus the exhaust gas is discharged to the outside of the housing through the exhaust port.

The intake port and the exhaust port are provided in the sidewall of the rotor, and opening and closing of the exhaust port and the intake port should be determined according to a rotation angle of the rotor. In other words, in order to adjust intake/exhaust timing, a disposition position of the intake port or the exhaust port should be changed.

In the structure, an overlap section where both the intake port and the exhaust port are opened may occur in an intake stroke of the engine, and in this case, there is a problem in that the exhaust gas is suctioned together with mixed air of fuel and air in the intake stroke. When the exhaust gas in the intake stroke is mixed, fuel and air are insufficient, and thus a problem that output of the engine is reduced occurs.

Meanwhile, the rotor is coupled to a crankshaft, which is an eccentric shaft, and rotates in the housing.

The crankshaft should be provided with an eccentric journal part to which the rotor is coupled, and thus is not manufactured as a single part and is implemented in a shape in which divided components are assembled.

The present invention is for securing required performance and reducing the number of components by improving a divided assembly structure of the crankshaft.

DISCLOSURE

Technical Problem

The present invention is directed to solving a problem that exhaust gas is introduced into a cylinder in a port overlap section where both an intake port and an exhaust port are opened in a rotary engine provided with the intake port and the exhaust port in a sidewall of a rotor.

Also, the present invention is directed to providing a structure capable of smoothly reducing the introduction of exhaust gas in an intake stroke and discharging the exhaust gas in an exhaust stroke in a multi-cylinder rotary engine provided with an intake port and an exhaust port in a sidewall of a rotor.

Also, the present invention is directed to improving a shape of an intake port or an exhaust port provided in a sidewall of a rotor which comes into contact with an apex seal to improve durability of the apex seal and the rotor.

Also, the present invention is directed to providing a structure which may be stably supported with contact when an apex seal passes through an intake port or an exhaust port provided in a sidewall of a rotor.

Also, the present invention is directed to improving a divided structure of a crankshaft which supports a rotor to prevent damage of the crankshaft even in a high load region.

Also, the present invention is directed to improving a divided structure of a crankshaft to reduce the number of components, and thus secure assembly of a product and reduce costs.

Technical Solution

One aspect of the present invention provides a rotary engine including: a housing provided with three lobe accommodation parts; a rotor which is provided with two lobes continuously accommodated in the lobe accommodation parts, is provided with an intake storage part configured to communicate with an intake port on a front surface-side, and is provided with an exhaust storage part configured to communicate with an exhaust port on a rear surface-side; an intake-side housing cover provided with an intake hole configured to communicate with the intake storage part; an exhaust-side housing cover provided with an exhaust hole configured to communicate with the exhaust storage part; and a crankshaft, wherein the exhaust storage part is prevented from communicating with the exhaust hole during an intake stroke at a portion of a section where the exhaust port is open and thus introduction of an exhaust gas into a stroke chamber during the intake stroke is reduced.

Further, the rotary engine according to the present invention provides a structure in which one end of the exhaust storage part is disposed to a portion overlapping the intake port, and thus the exhaust gas may be smoothly discharged in an exhaust stroke.

The rotary engine according to the present invention includes a housing provided with an epitrochoidal curve-shaped combustion chamber, a rotor provided with an intake port and an exhaust port, a housing cover overlappingly coupled to the combustion chamber, and an apex seal which comes into contact with an outer side surface of the rotor and partitions the combustion chamber, wherein the intake port or the exhaust port is provided with an inclined surface in a surface parallel to the apex seal.

Further, in the rotary engine according to the present invention, the intake port or the exhaust port may be divided in a thickness direction of the rotor, and may be provided with a guide surface which supports the apex seal at a space between the divided intake port or the divided exhaust port.

Another aspect of the present invention provides a rotary engine including: a housing provided with N (N is a natural number of 3 or more) lobe accommodation parts therein; a rotor which eccentrically rotates from a center of the housing and is provided with N−1 lobes continuously accommodated in the lobe accommodation parts; an intake-side housing cover which overlaps the lobe accommodation part to be coupled to a front surface portion of the housing; an exhaust-side housing cover which overlaps the lobe accommodation part to be coupled to a rear surface portion of the housing; and a crankshaft having a front surface and a rear surface respectively supported by the intake-side housing cover and the exhaust-side housing cover, wherein an eccentric journal part disposed therebetween is coupled to the rotor.

A divided structure in which the crankshaft includes a first crankshaft including a front surface journal part supported by the intake-side housing cover and an eccentric journal part coupled to the rotor are integrated, and a second crankshaft including a rear surface journal part coupled to the first crankshaft and supported by the exhaust-side housing cover is provided.

Advantageous Effects

A rotary engine according to the present invention can reduce the introduction of exhaust gas into a cylinder in an overlap section where both an intake port and an exhaust port are opened in an intake stroke.

The rotary engine according to the present invention allows the exhaust gas to be smoothly discharged even in the second half of the exhaust stroke.

The rotary engine according to the present invention can reduce damage due to interference when an apex seal passes through the intake port or the exhaust port.

The rotary engine according to the present invention can secure the durability of the apex seal and the rotor.

The rotary engine according to the present invention provides a structure in which a crankshaft is assembled with two shaft components and one fastening means so that the rotary engine can stably operate in even in a high load region.

Further, since the crankshaft of the rotary engine according to the present invention is assembled by three components in a structure in which a first crankshaft and a second crankshaft are coupled by the fastening means, the number of components can be reduced and assembly can be improved.

REFERENCE NUMERALS

| | |
|---|---|
| 100: rotary engine | 107: sealing unit |
| 110: housing | 111: lobe accommodation part |
| 112: combustion chamber | 113: mounting hole |
| 114: peak part | 117: apex seal |
| 120, 120-1: rotor | 121,121-1: support part |
| 122, 122-1: through hole | 123a, 123a-1: intake storage part |
| 123b, 123b-1: exhaust storage part | 124a, 124a-1: intake port |
| 124b, 124b-1: exhaust port | 125, 125-1: rib |
| 127: side seal | 130: spark plug |
| 140: housing cover | 141: intake-side housing cover |
| 141a: intake hole | 142: exhaust-side housing cover |
| 142a: exhaust hole | 160: guide gear |
| 170: rotor gear | 171: flange part |
| 172: gear part | 173: boss part |
| 174: accommodation part | 180: crankshaft |
| 180-1: first crankshaft | 180-2: second crankshaft |
| 181: front surface journal part | 182a: reference surface |
| 182: eccentric journal part | 183a: coupling groove |
| 183: rear surface journal part | 184: insertion section |
| 184': insertion section | 185: oil flow path |
| 186: discharge hole | 187: fastening bolt |
| 188: fastening nut | 189: balance weight |
| 190: rotor position sensor | 195: bracket |

MODES OF THE INVENTION

Hereinafter, a rotary engine according to embodiments of the present invention will be described in detail with reference to the drawings.

The rotary engine is configured so that a rotor eccentrically rotates in a housing, and thus volumes of N stroke chambers formed between the housing and the rotor are changed, and in this process, four strokes of intake→compression→combustion/expansion→exhaust continuously occur. A crankshaft rotates in response to the eccentric rotation of the rotor, and transfers power generated by connection to the other engine.

Figure 1:
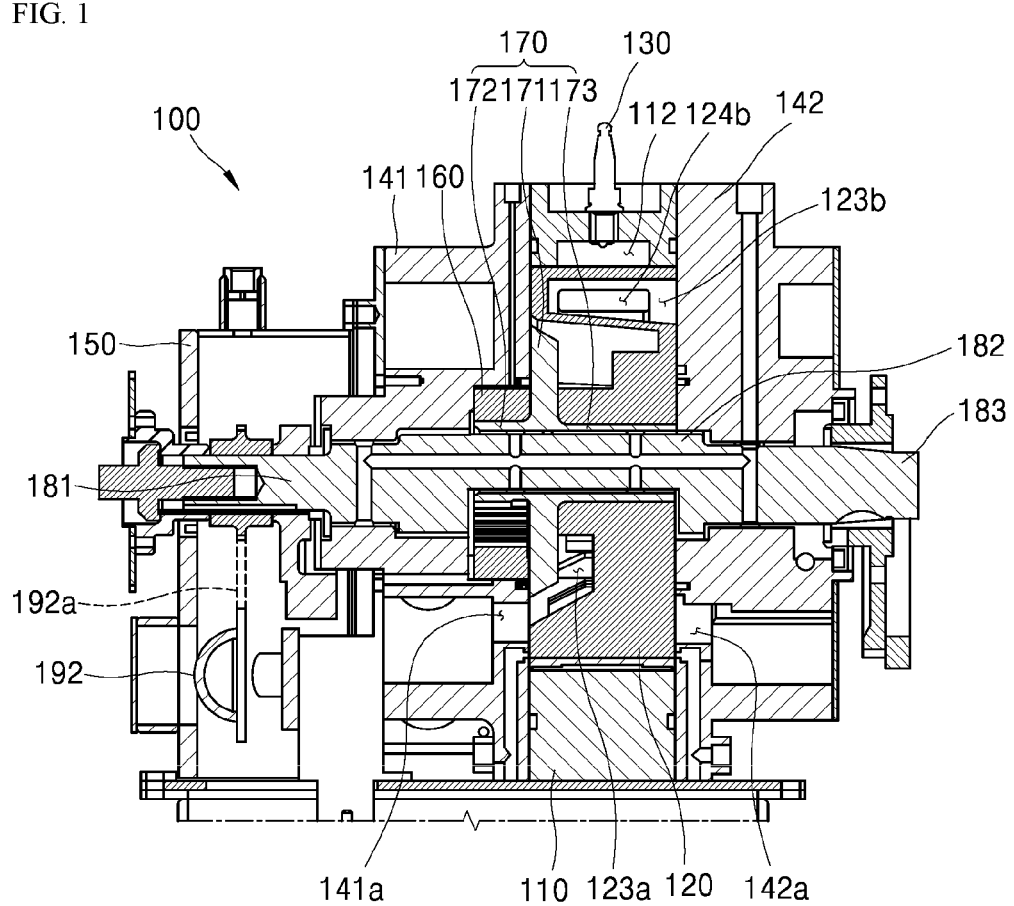
FIG. 1 is a longitudinal cross-sectional view of a rotary engine according to the present invention.
Figure 2:
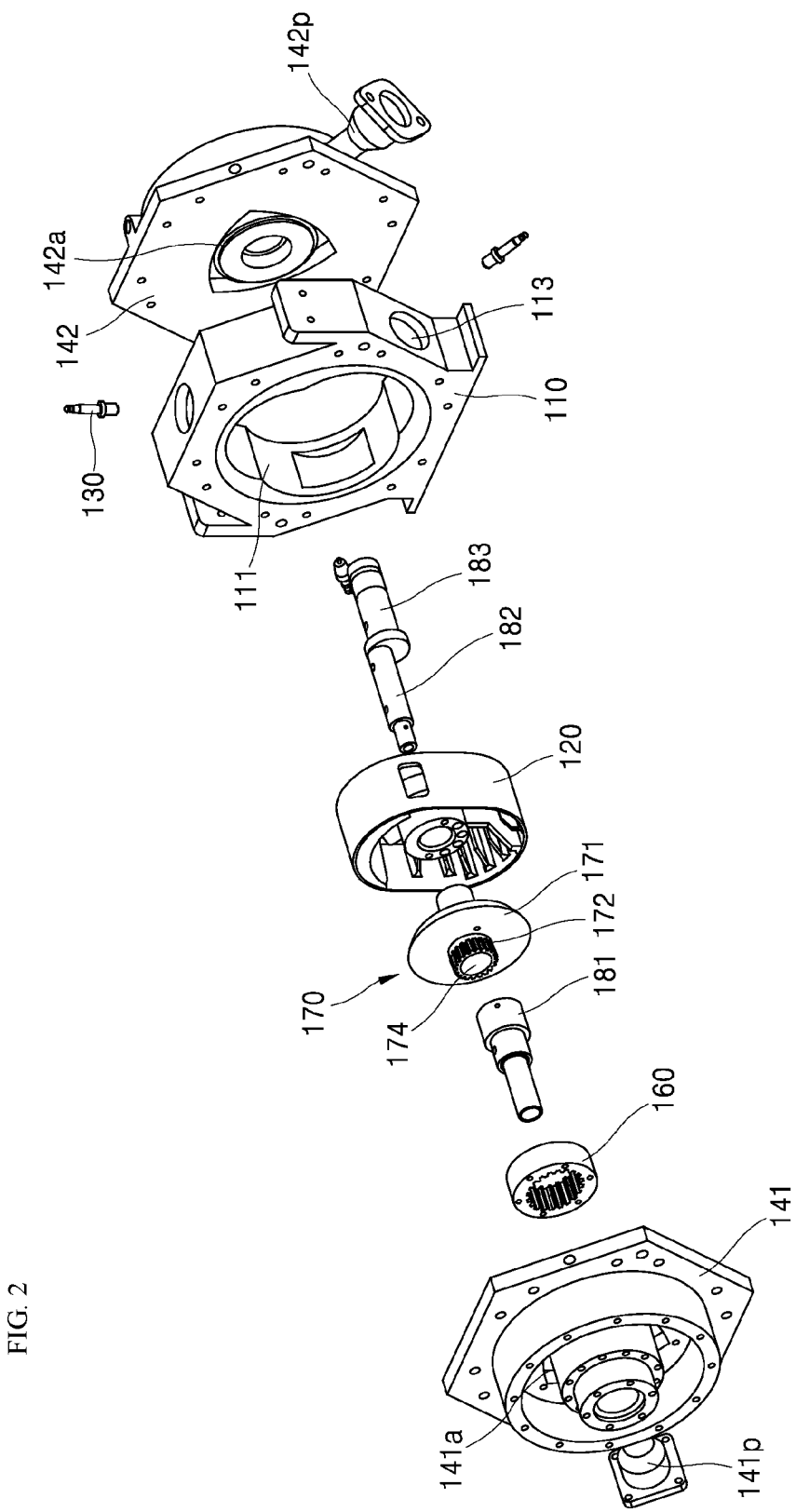
FIG. 2 is an exploded perspective view of some components of the rotary engine shown in FIG. 1.
Figure 3:
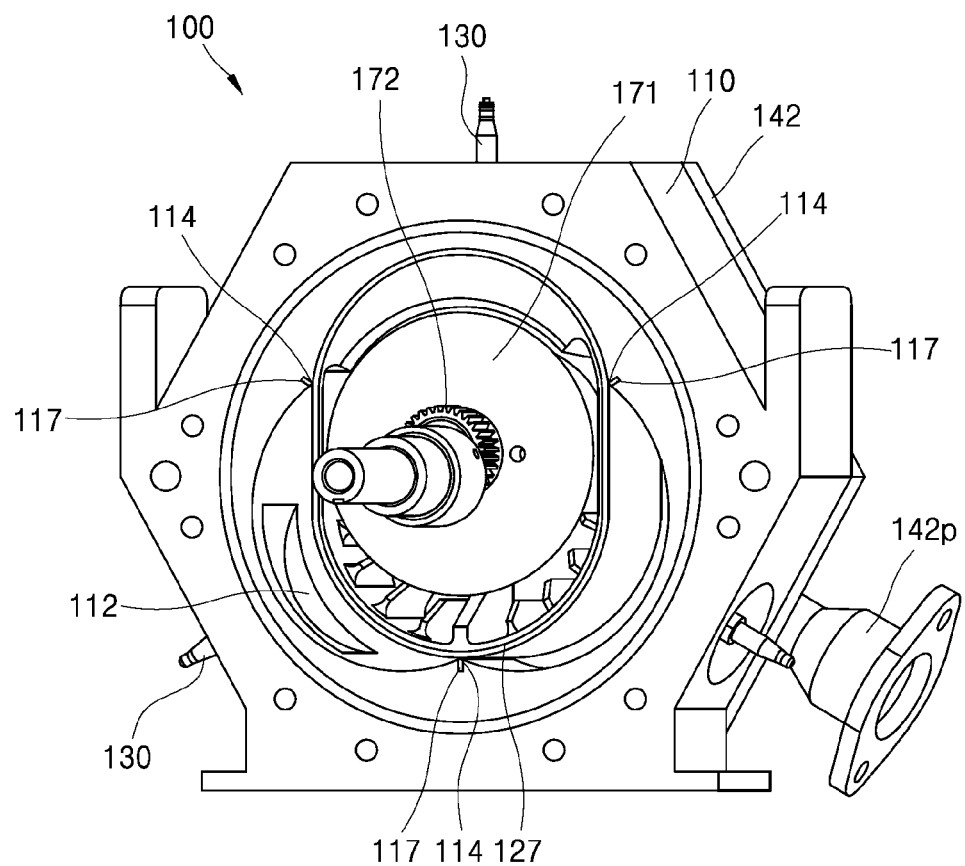
FIG. 3 is an exploded perspective view of a part of the internal structure of the rotary engine shown in FIG. 1.

FIG. 1 is a longitudinal cross-sectional view of the rotary engine according to the present invention, FIG. 2 is an exploded perspective view of some components of the rotary engine shown in FIG. 1, and FIG. 3 is a conceptual diagram illustrating an inner structure of the rotary engine shown in FIG. 1.

First, referring to FIGS. 1 and 2, a rotary engine 100 according to the present invention includes a housing 110, a spark plug 130, a rotor 120, a housing cover 140, a rotor gear 170, and a crankshaft 180.

First, N (N is a natural number of 3 or more) lobe accommodation parts 111 are provided in the housing 110. In the embodiment, an example in which the number of lobe accommodation parts 111 is three (that is, N is three) is shown.

The shape of the lobe accommodation part 111 and a lobe which will be described later may be designed on the basis of an epitrochoidal curve which is a trajectory drawn by an arbitrary point on a rolling circle according to rotation of the rolling circle, when there is the rolling circle which moves while rotating on an arbitrary shape.

N combustion chambers 112 which communicate with the lobe accommodation parts 111 are respectively provided in the upper center of the lobe accommodation parts 111.

Referring to FIG. 3, the combustion chamber 112 has a shape recessed from an inner sidewall of the housing 110 forming the lobe accommodation part 111. A size of the combustion chamber 112 may be designed differently according to the compression ratio of the rotary engine 100.

In the housing 110, spark plugs 130 which discharge sparks to the combustion chambers 112 to ignite mixed air filled in the combustion chambers 112 may be installed. The spark plugs 130 are mounted in mounting holes 113 of the housing 110, and may be disposed to be exposed at upper portions of the combustion chambers 112. The mounting holes 113 are configured to communicate with the combustion chambers 112.

Meanwhile, a rotor 120-1 is inserted into the lobe accommodation parts 111, and is configured to eccentrically rotate with respect to the centers of the lobe accommodation parts 111. The rotor 120-1 is provided with N−1 lobes which are continuously accommodated in the lobe accommodation parts 111 during eccentric rotation.

In the above-described embodiment, three lobe accommodating parts 111 are uniformly arranged with a phase difference of 120° in the housing, and two lobes are arranged with a phase difference of 180° in the rotor 120-1.

As shown in FIG. 2, the rotor gear 170 includes a flange part 171, a gear part 172, and an accommodation part 174. The flange part 171 has a flat plate shape and is configured to be supported and fixed to a support part 121 of the rotor 120. The gear part 172 is formed on one surface of the flange part 171 to be inscribed to a guide gear 160.

The accommodation part 174 is formed to pass through the gear part 172 so that an eccentric journal part 182 of the crankshaft 180 may be inserted thereinto.

The crankshaft 180 includes front and rear surface journal parts 181 and 183 configured to pass through the rotary engine 100, and an eccentric journal part 182 eccentrically formed from the front and rear surface journal parts 181 and 183 to be inserted into the accommodation part 174 of the rotor gear 170.

The front and rear surface journal parts 181 and 183 pass through an intake-side housing cover 141 in a frontward direction, and pass through an exhaust-side housing cover 142 in a rearward direction.

The crankshaft 180 is connected to the other engine (system) and transmits power formed by the rotary engine 100 of the present invention to the other engine (system).

The intake-side housing cover 141 is coupled to the housing 110 to cover one side of the lobe accommodation part 111. A sealing component (not shown) is installed on the intake-side housing cover 141 to maintain airtightness between the housing 110 and the rotor 120-1.

The intake-side housing cover 141 serves as a path which seals the housing 110, and delivers the suctioned mixed air to the rotor 120-1. To this end, the intake side housing cover 141 is provided with an intake hole 141*a* which communicates with an intake storage part 123*a* provided in a front portion of the rotor 120-1.

The guide gear 160 is mounted at an inner side of the intake-side housing cover 141 facing the lobe accommodation part 111. The guide gear 160 is formed in a ring shape having teeth formed along an inner circumference. The rotor gear 170 is configured to be inscribed to the guide gear 160 and rotate. The number of the teeth of the guide gear 160 is designed in consideration of a rotation ratio between the rotor 120 and the crankshaft 180 which transfers the power.

Structurally, when the rotor 120 eccentrically rotates one time in a counterclockwise direction, the crankshaft 180 rotates N−1 times in a clockwise direction.

In other words, like the embodiment, in the case in which the number of the lobes is three, the rotor 120-1 rotates one time (rotates 360°) when the crankshaft 180 rotates two times (rotates 720°).

The exhaust-side housing cover 142 is coupled to the housing 110 to cover the other side of the lobe accommodation part 111. The exhaust-side housing cover 142 serves as a path which closes the housing 110 and discharges the generated exhaust gas. To this end, the exhaust-side housing cover 142 is provided with an exhaust hole 142*a* which communicates with the exhaust storage part provided at a rear surface portion of the rotor 120.

The rotary engine 100 of the present invention having the above-described structure operates in 4 strokes of intake—compression—combustion/expansion—exhaust during one cycle. Hereinafter, the movement of the rotor 120 in the housing 110 during each stroke will be described.

Figure 4:
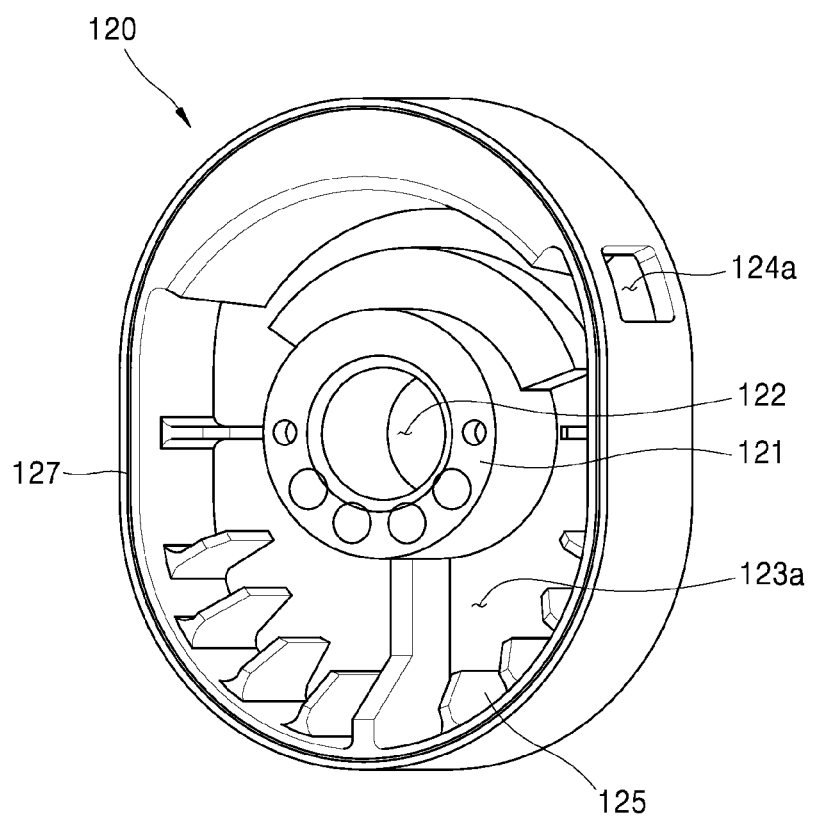
FIGS. 4 to 7 are conceptual diagrams for describing four strokes of intake→compression→combustion/expansion→exhaust in the rotary engine shown in FIG. 3 on the basis of a rotation angle of the rotor.

FIGS. 4 to. 7 are conceptual diagrams for describing processes of intake→compression→combustion/expansion→exhaust in the rotary engine shown in FIG. 3 on the basis of a rotation angle of the rotor. In the drawings, an angle of the crankshaft may be increased or decreased 5°. The increase and decrease may be changed by an error, a characteristic of each engine, or the like.

As described above, a side surface portion of the rotor 120 is provided with an intake port 124*a* and an exhaust port 124*b*.

In a description of the intake stroke with reference to FIG. 4, the intake stroke is performed by the rotor 120 which rotates in the housing 110 in the counterclockwise direction, and is performed while the rotation angle of the rotor 120 changes from 0° to −120°.

Since the rotor 120 rotates in the counterclockwise direction, a minus sign (−) is shown with the angle. The rotor 120 rotates in the counterclockwise direction when viewed from the front, but rotates in the clockwise direction when viewed from the rear.

The intake stroke is performed while a rotation angle of the crankshaft 180 changes from 0 to +240°. Since the crankshaft 180 rotates in the clockwise direction, a plus sign (+) is shown with the angle.

In the drawings, the mixed air is introduced into the lobe accommodation parts 111 provided in an upper portion of the housing 110 and the combustion chambers 112 which communicate with the lobe accommodation parts 111 through the intake port 124*a* while the rotor 120 rotates in the counterclockwise direction from 0° to −120°.

In this case, as described above, although the most intake is performed when the rotation angle of the rotor 120 is −90°, the rotary engine 100 of the present invention is designed so that the intake may be performed up to −120°.

The above is provided to increase the efficiency of the rotary engine due to overexpansion in an expansion stroke which will be performed later.

Figure 5:
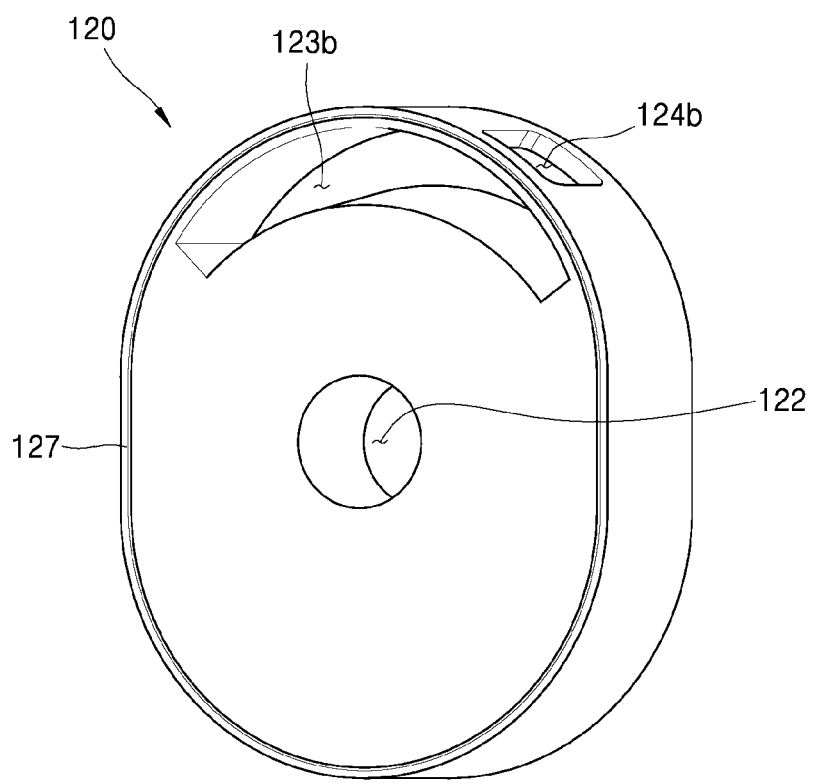

Further, referring to FIG. 5, the mixed air after the intake stroke is started to be compressed by the rotation of the rotor 120. The compression stroke is performed while the rotation angle of the rotor 120 changes from −120° to −180°.

The compression ratio is maximized when the rotor 120 rotates −180°, and in this case, the mixed air is ideally completely filled in the combustion chambers 112.

At the end of the compression stroke, ignition by the spark plug 130 is started, and thus a combustion process of the mixed air is started. The combustion process continues until the combustion/expansion stroke. The combustion process is started when the rotation angle of the rotor 120 is roughly −160°, and is completely ended when the rotation angle of the rotor 120 is roughly −200°.

In other words, the combustion process should be started by the ignition of the spark plug 130, and an ignition time of the spark plug should be set based on a position of the rotor 120.

Meanwhile, in the drawings, the intake stroke in which the mixed air is introduced through the intake port 124*a* is started at the lobe accommodation parts 111 provided at a left lower portion of the housing 110 and the combustion chambers 112 which communicate with the lobe accommodation parts 111.

That is, the strokes of intake→compression→combustion/expansion→exhaust continuously occur at the lobe accommodation parts 111 corresponding to the rotation direction of the rotor 120 and the combustion chambers 112 which communicate with the lobe accommodation parts 111.

Figure 6:
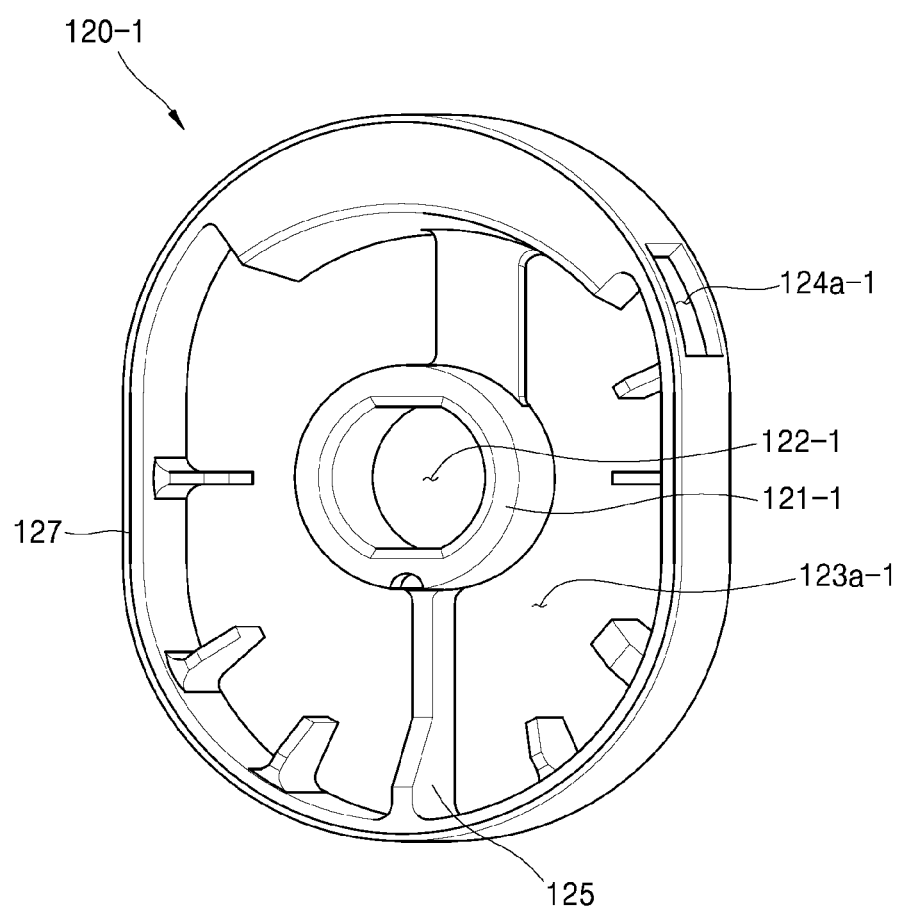

Next, referring to FIG. 6, the combustion/expansion stroke is performed while the rotation angle of the rotor 120 changes from −180° to −270°. The combustion process started at the end of the preceding compression stroke completely ends at an early stage of the combustion/expansion stroke.

The intake of the mixed air in the intake stroke is as much as a volume at a state in which the rotation angle of the rotor 120 is −120°, that is, a case in which the rotor 120 rotates −240° in the drawing, but the expansion stroke is performed until the rotation angle of the rotor 120 becomes 270° and thus a larger volume is formed.

Accordingly, the rotary engine 100 of the present invention may obtain an overexpansion effect forming an expansion greater than the intake volume.

Figure 7:
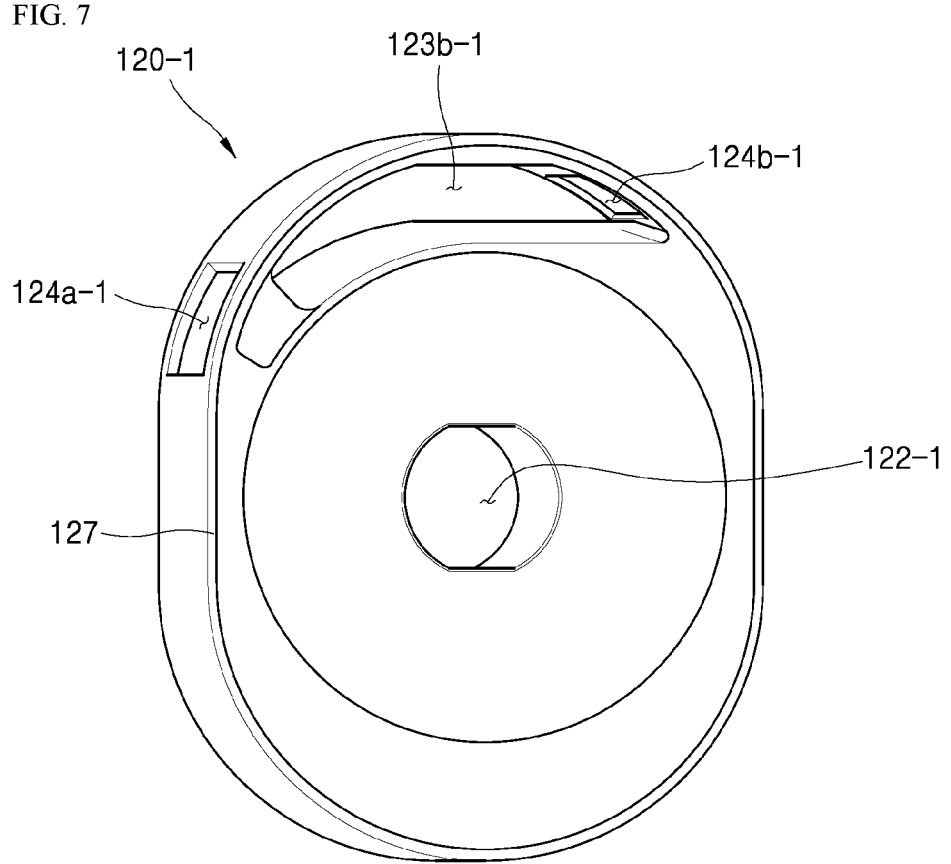

Further, referring to FIG. 7, the exhaust stroke is performed while the rotation angle of the rotor 120 changes from −270° to −360°. The exhaust gas which is generated is discharged through the exhaust port 124*b* while the rotor 120 rotates from −270° to −360° in the counterclockwise direction.

Figure 8:
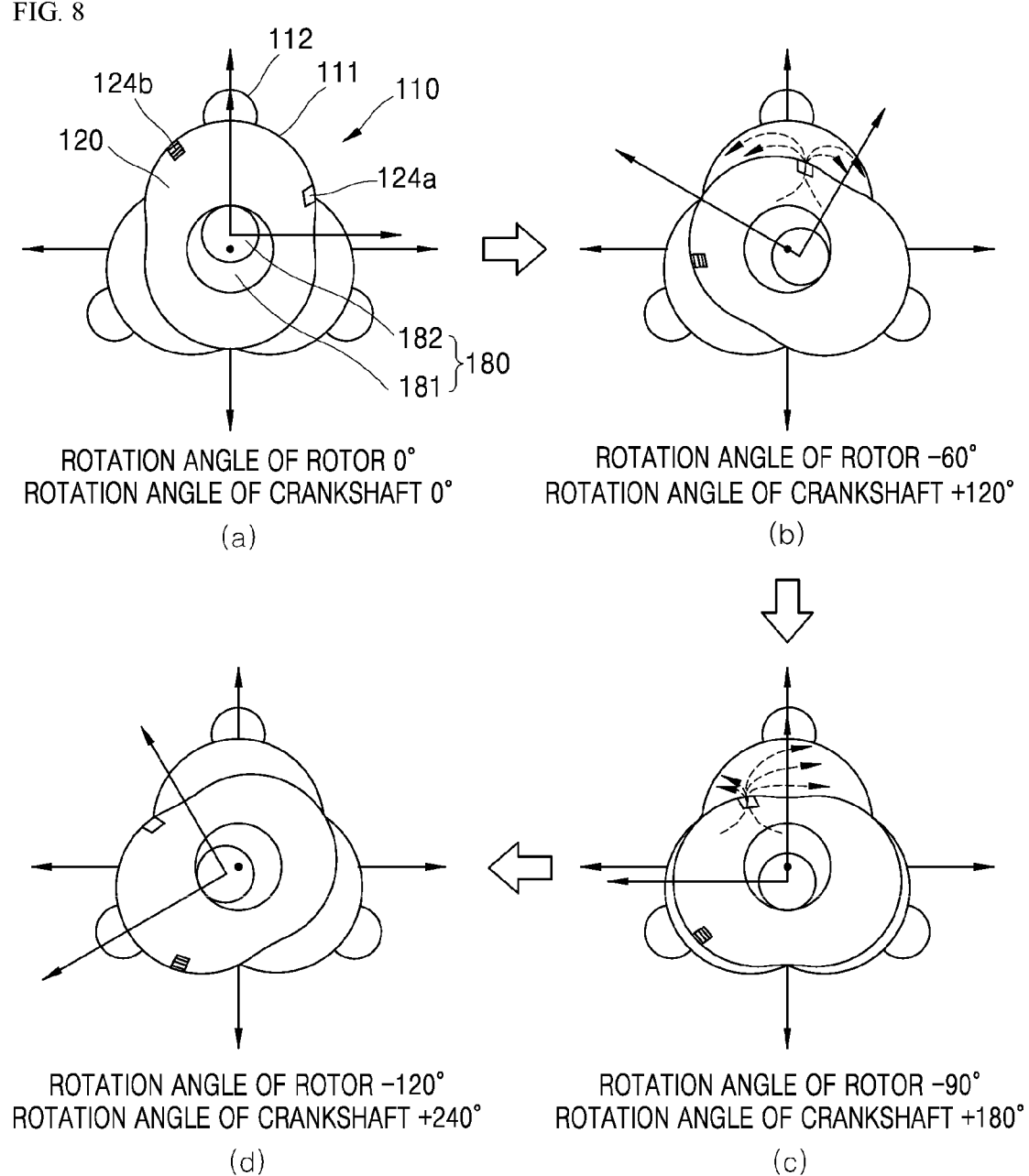
FIG. 8 is a front perspective view illustrating an intake side surface of a general rotor (comparative example).
Figure 9:
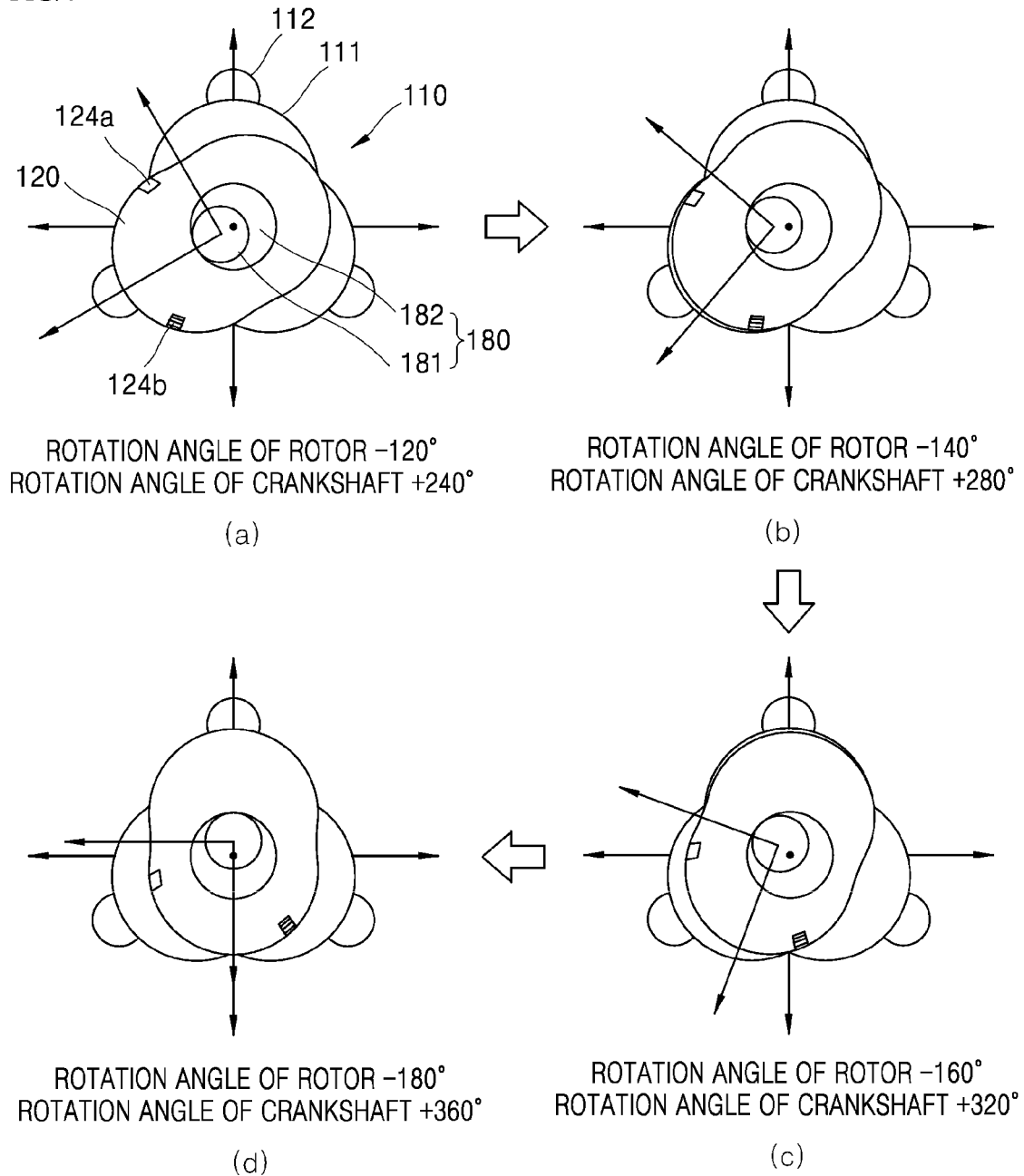
FIG. 9 is a rear perspective view illustrating an exhaust side surface of the rotor shown in FIG. 8.

FIG. 8 is a front perspective view illustrating an intake side surface of a general rotor (comparative example), and FIG. 9 is a rear perspective view illustrating an exhaust side surface of the rotor shown in FIG. 8.

Figure 10:
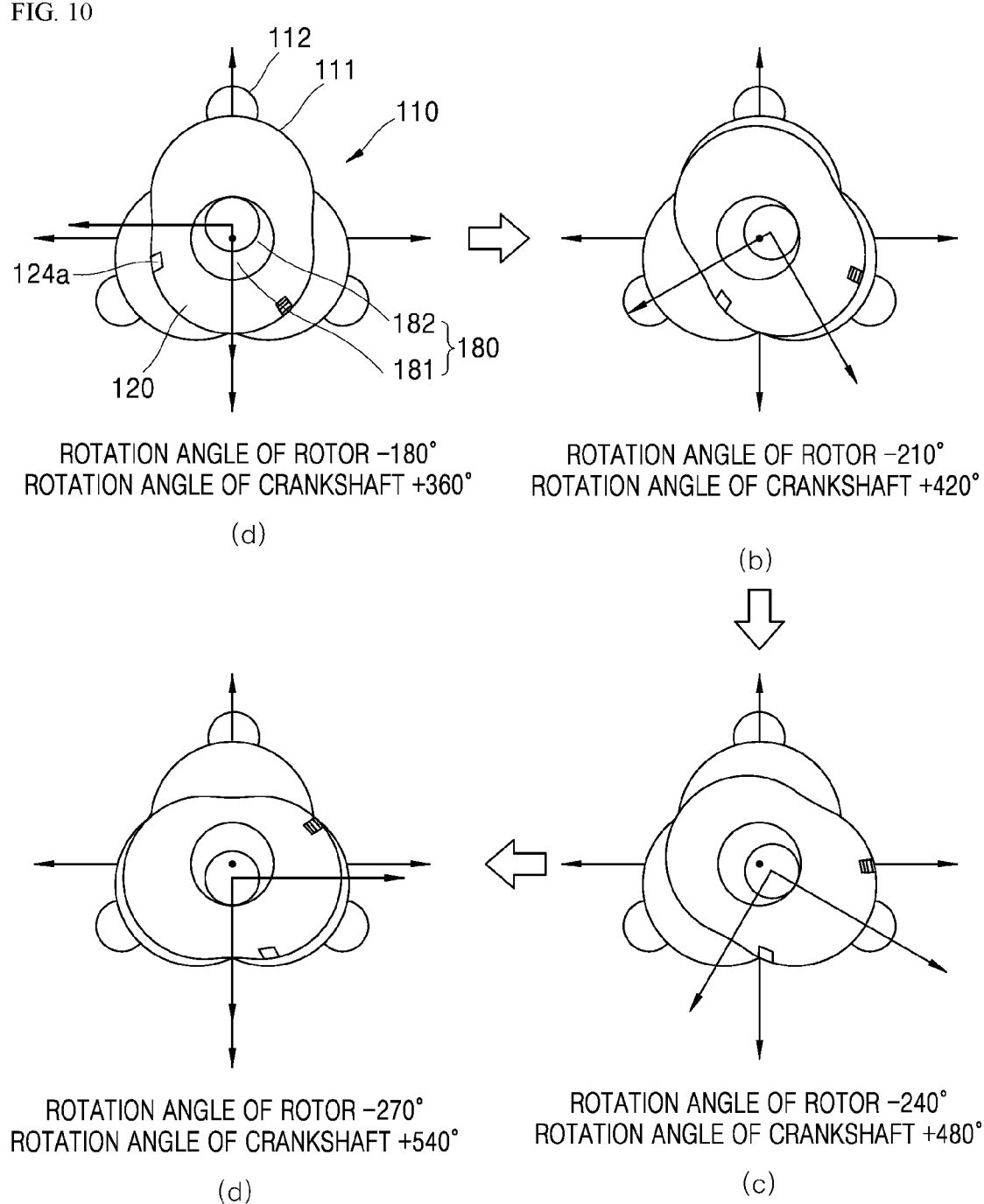
FIG. 10 is a front perspective view illustrating an intake side surface of a rotor according to an embodiment of the present invention.
Figure 11:
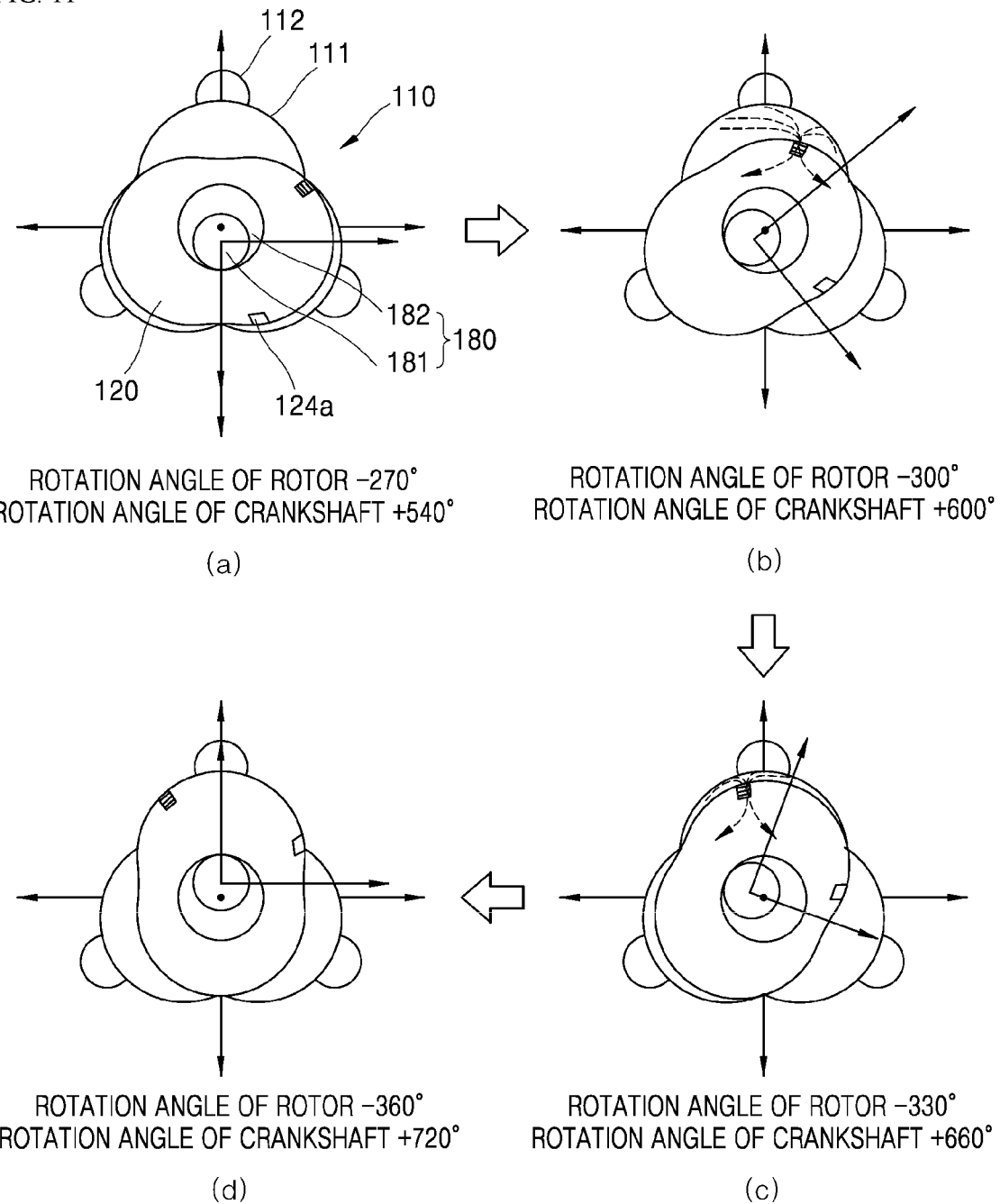
FIG. 11 is a rear perspective view illustrating an exhaust side surface of the rotor shown in FIG. 10.

FIG. 10 is a front perspective view illustrating an intake side surface of a rotor according to an embodiment of the present invention, and FIG. 11 is a rear perspective view illustrating an exhaust side surface of the rotor shown in FIG. 10.

Referring to FIGS. 8 to 11, a support part 121 or 121-1 on which the rotor gear 170 is mounted is formed in a center portion of the rotor 120 or 120-1, and a through hole 122 or 122-1 through which the crankshaft 180 inserted into the rotor gear 170 passes is formed in the support part 121 or 121-1.

The flange part 171 of the rotor gear 170 is supported on a front surface of the support part 121 or 121-1, and a solid coupling state with the flange part 171 is maintained by a fastening means such as a fastening member or the like.

An intake storage part 123a or 123a-1 which temporarily stores the mixed air suctioned through the intake-side housing cover 141 is formed in a front surface portion of the rotor 120 or 120-1. The intake storage part 123a has a shape recessed from the front surface portion to the rear surface portion of the rotor 120 or 120-1 (that is, in an axial direction of the crankshaft 180).

Since the intake storage part 123a or 123a-1 is formed, a portion of the rotor 120 (as described above, a portion of the intake storage part 123a or 123a-1 which does not share a sidewall with an exhaust storage part 123b or 123b-1) has a thin edge and thus rigidity may be degraded.

In consideration of the above, a rib 125 or 125-1 which reinforces the rigidity of the rotor 120 or 120-1 may be formed to protrude from a plurality of places on an inner side surface of the rotor 120 or 120-1 forming the intake storage part 123a or 123a-1.

In this case, at least one rib may be configured to be connected to the support part 121 or 121-1, and may be formed by including a portion having a height smaller than a thickness of the rotor 120 or 120-1 so that the mixed air temporarily stored in the intake storage part 123a or 123a-1 may move in an opposite direction.

An intake port 124a or 124a-1 which communicates with the intake storage part 123a or 123a-1 is formed in a side surface portion of the rotor 120 so that the suctioned mixed air may be introduced into the lobe accommodation part 111.

In the embodiment and the comparative example of the present invention, both the intake ports 124a and 124a-1 may be formed at positions capable of suctioning the mixed air while the rotors 120 and 120-1 rotate 120° in the counterclockwise direction.

An exhaust storage part 123b or 123b-1 which temporarily stores the exhaust gas generated after the combustion is formed in the rear surface portion of the rotor 120 or 120-1. The exhaust storage part 123b or 123b-1 has a shape recessed from the rear surface portion to the front surface portion of the rotor 120 or 120-1 (that is, in an axial direction of the crankshaft 180).

The exhaust gas temporarily stored in the exhaust storage part 123b or 123b-1 passes through the exhaust hole 142a of the exhaust-side housing cover 142 and is discharged to the outside through an exhaust pipe 142p.

An exhaust port 124b or 124b-1 which communicates with the exhaust storage part 123b or 123b-1 is formed in a side surface portion of the rotor 120 or 120-1 so that the exhaust gas generated after the combustion may be introduced into the exhaust storage part 123b or 123b-1.

In the above-described embodiment and comparative example, both the exhaust ports 124b and 124b-1 may be formed at positions where exhaust is possible after the rotors 120 and 120-1 rotate 270° in the counterclockwise direction to be disposed after expansion more than an intake amount is performed. Due to the overexpansion, the efficiency of the rotary engine 100 may be increased.

In the embodiment and the comparative example, the positions of the intake ports 124a and 124a-1 and the positions of the exhaust ports 124b and 124b-1 are the same, and shapes of the intake storage parts 123a and 123a-1 and shapes of the exhaust storage parts 123b and 123b-1 are different.

The exhaust storage part 123b-1 according to the embodiment of the present invention may allow the exhaust gas to be smoothly exhausted in the exhaust stroke while decreasing the introduction of the exhaust gas into a cylinder in the intake stroke.

To this end, as shown in FIG. 11, a left end portion of the exhaust storage part 123b-1 is formed to a section overlapping the intake port 124a-1. The above-described structure causes an effect in that the exhaust storage part 123b-1 and the exhaust hole smoothly communicate with each other in the exhaust stroke.

Further, a right end portion of the exhaust storage part 123b-1 may be started in a region where the exhaust port 124b-1 is formed. The above-described structure causes an effect in that a section where the exhaust storage part 123b-1 and the exhaust hole communicate with each other in the intake stroke is decreased and thus a case in which the exhaust gas is suctioned together with the mixed air is decreased.

Hereinafter, a difference between the rotor 120-1 according to the embodiment of the present invention and the rotor 120 according to the comparative example in the intake stroke and the exhaust stroke will be looked at.

The following drawings illustrate a state viewed from a back surface of the rotary engine, and the rotors 120 and 120-1 rotate in the clockwise direction.

Figure 12:
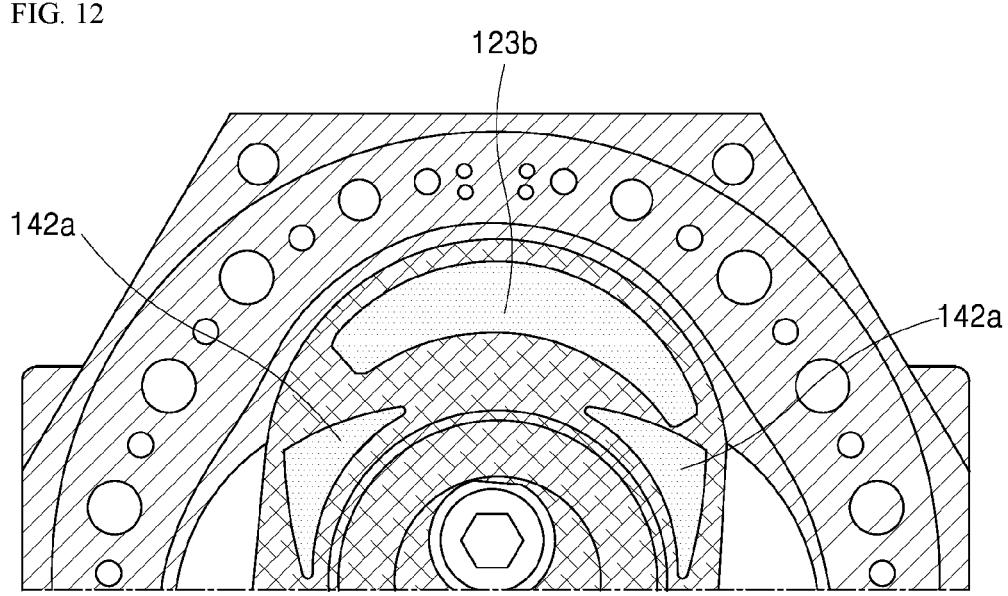
FIGS. 12 and 14 are views illustrating relative positions of an exhaust storage part and an exhaust hole in an intake stroke according to the comparative example of the present invention.
Figure 13:
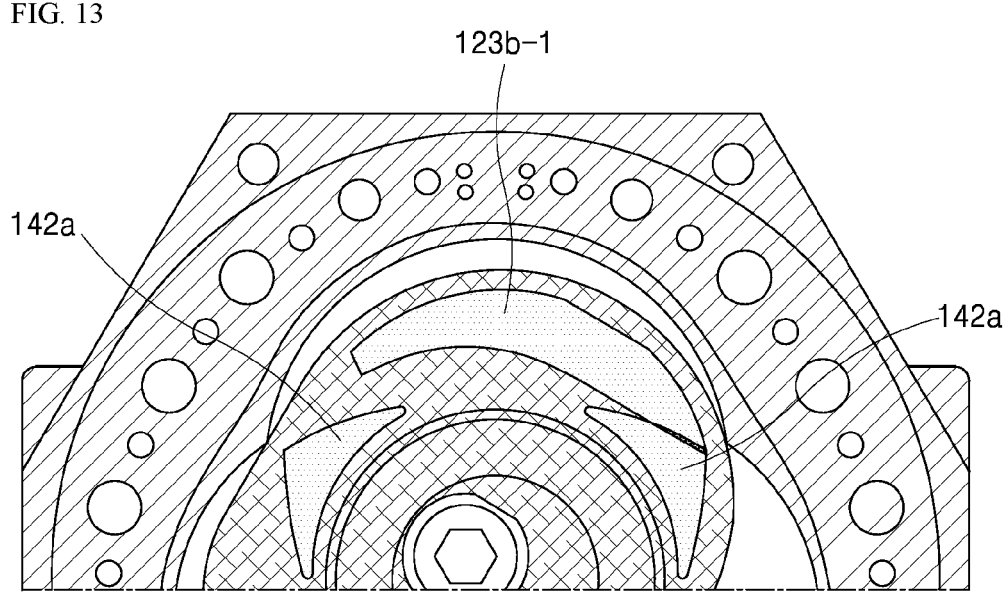
FIGS. 13 and 15 are views illustrating relative positions of an exhaust storage part and an exhaust hole in an intake stroke of a rotor according to a first embodiment of the present invention.
Figure 14:
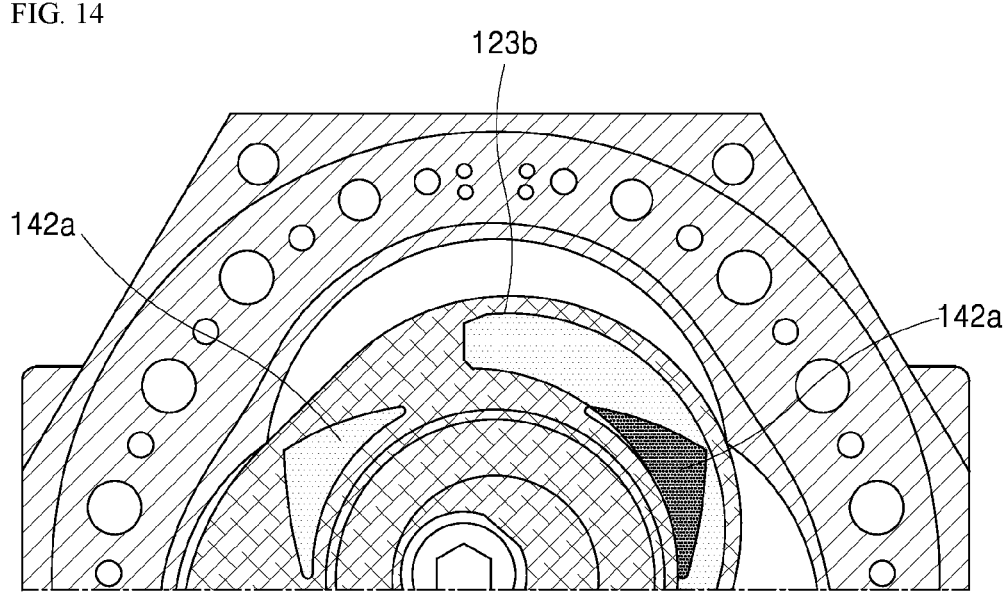
Figure 15:
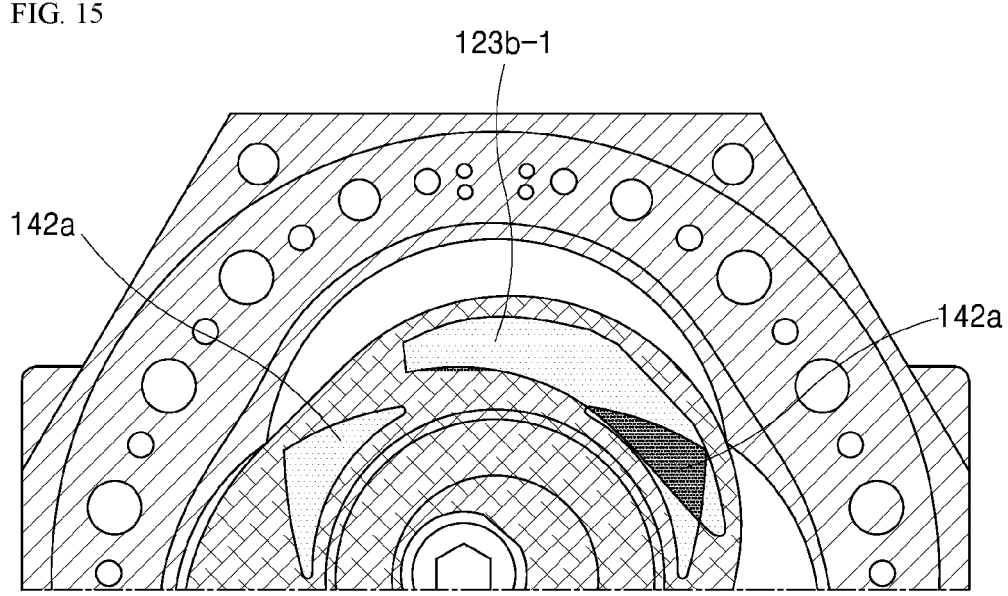

FIGS. 12 and 14 are views illustrating relative positions of the exhaust storage part 123b and the exhaust hole 142a in the intake stroke according to the comparative example of the present invention, and FIGS. 13 and 15 are views illustrating relative positions of the exhaust storage part 123b-1 and the exhaust hole 142a in an intake stroke of a rotor according to a first embodiment of the present invention.

Referring to FIG. 12, a state in which the rotation angle of the crankshaft is 10° is shown, and FIG. 14 illustrates a state in which the rotation angle of the crankshaft is 90°.

As shown in FIG. 4 like the above, the intake stroke is performed in a range in which the rotation angle of the crankshaft is 0° to 240°, and in this process, the exhaust port 124b is located in a stroke chamber in a range in which the rotation angle of the crankshaft is 0° to 90°. In other words, the exhaust port 124b is opened in the range in which the rotation angle of the crankshaft is 0° to 90°.

When the exhaust port 124b is opened, the exhaust gas which remains in the exhaust storage part 123b may be suctioned into the stroke chamber.

Referring to FIGS. 12 and 14 which are the comparative example, when the rotation angle of the crankshaft is 0° to 90°, it can be seen that the exhaust storage part 123b and the exhaust hole 142a communicate with each other.

On the other hand, referring to FIGS. 13 and 15 which are the embodiment, when the rotation angle of the crankshaft is 60° to 90°, it can be seen that the exhaust storage part 123*b*-1 and the exhaust hole 142*a* communicate with each other. In other words, in the case of the embodiment, when the rotation angle of the crankshaft is smaller than 60°, since the exhaust storage part 123*b*-1 may not communicate with the exhaust hole 142*a* even when the exhaust port is opened, the introduction of the exhaust gas into the stroke chamber through the exhaust port may be reduced.

Figure 16:
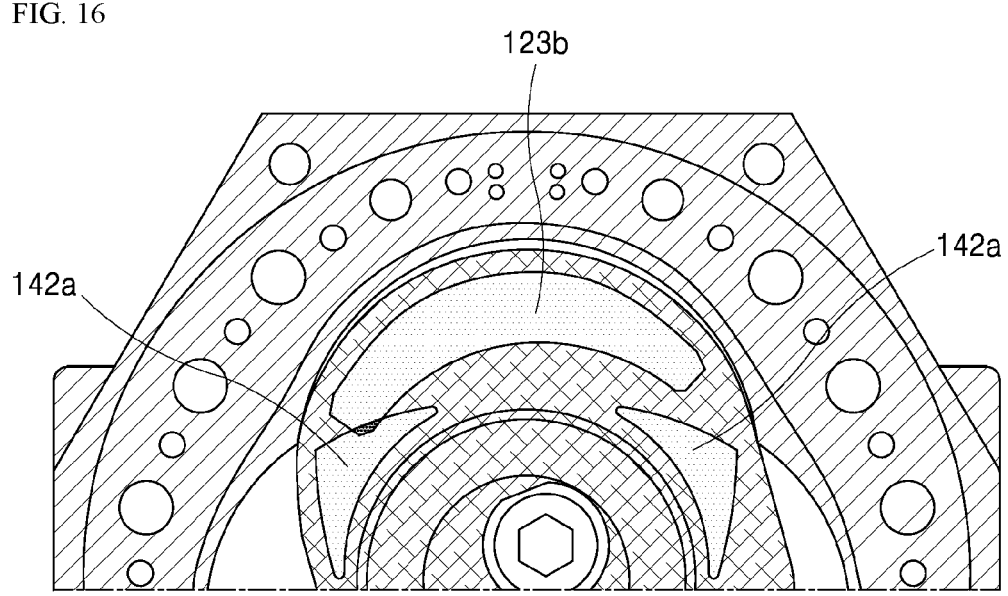
FIGS. 16 and 18 are views illustrating relative positions of the exhaust storage part and the exhaust hole in an exhaust stroke according to the comparative example of the present invention.
Figure 17:
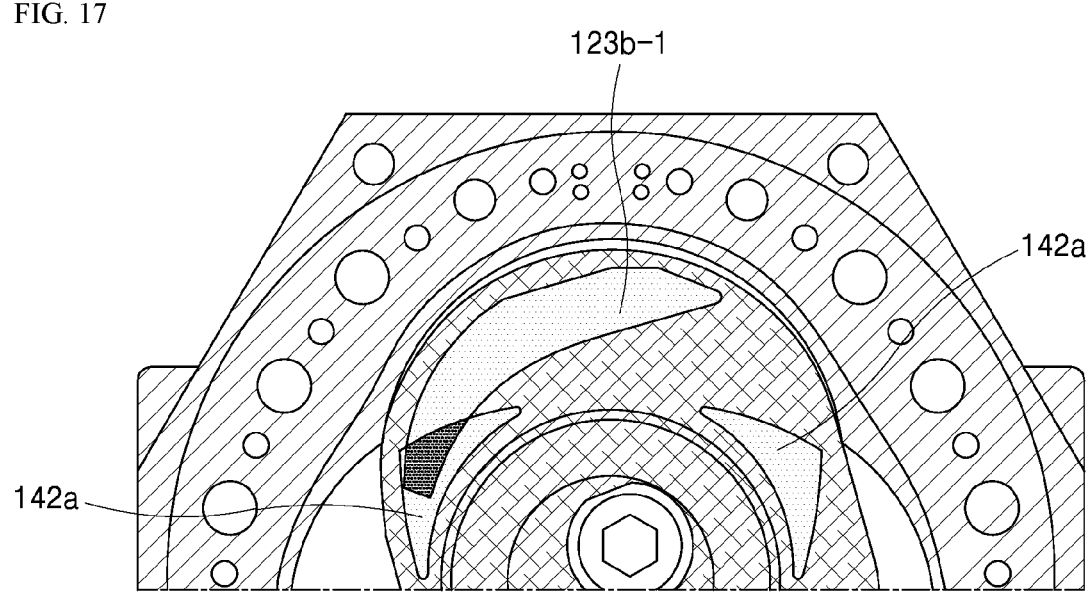
FIGS. 17 and 19 are views illustrating relative positions of an exhaust storage part and the exhaust hole in an exhaust stroke of the rotor according to the first embodiment of the present invention.
Figure 18:
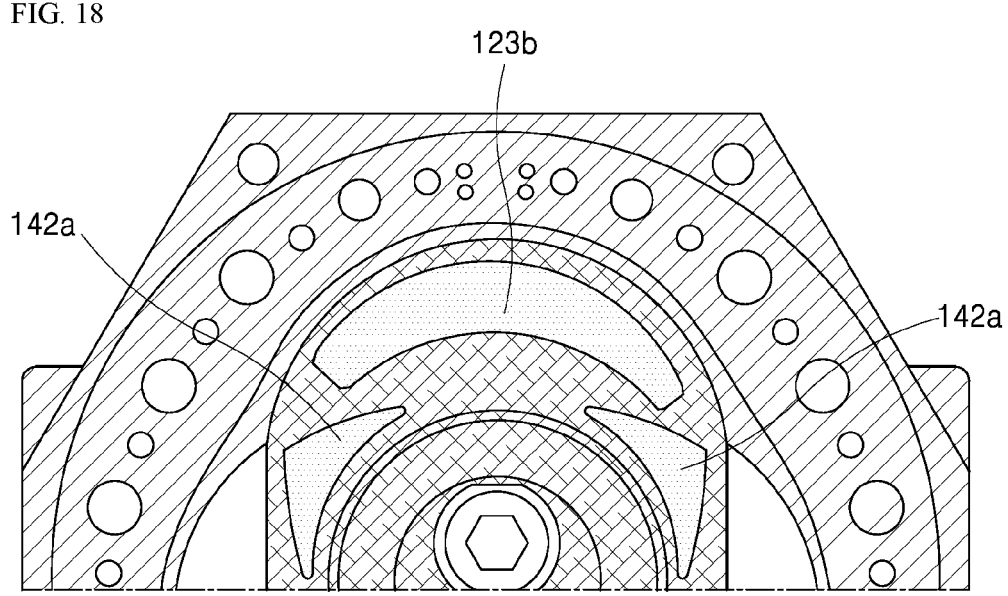
Figure 19:
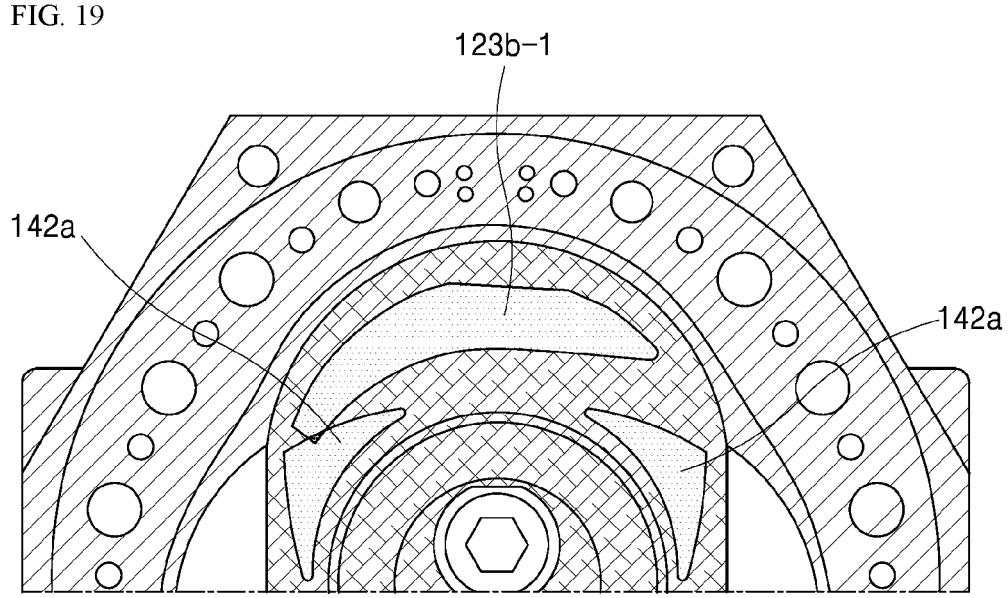

FIGS. 16 and 18 are views illustrating relative positions of the exhaust storage part 123*b* and the exhaust hole 142*a* in an exhaust stroke according to the comparative example of the present invention, and FIGS. 17 and 19 are views illustrating relative positions of the exhaust storage part 123*b*-1 and the exhaust hole 142*a* in the exhaust stroke of the rotor according to the embodiment of the present invention.

The exhaust stroke is performed in a range in which the rotation angle of the crankshaft is 540° to 720°, and in both the comparative example and the embodiment, the exhaust storage part and the exhaust hole communicate with each other in a range in which the rotation angle of the crankshaft is 540° to 690° but have a difference in a section from 690° to 720°.

Referring to FIGS. 16 and 18, in the comparative example, when the angle of the crankshaft is 690° to 720° in the exhaust stroke, it can be seen that the exhaust storage part 123*b* and the exhaust hole 142*a* may not communicate with each other.

Referring to FIGS. 17 and 19, in the first embodiment, when the angle of the crankshaft is 690° to 720° in the exhaust stroke, it can be seen that the exhaust storage part 123*b*-1 and the exhaust hole 142*a* communicate with each other.

In other words, in a section from 540° to 720° of the exhaust stroke, although the exhaust storage part 123*b* and the exhaust hole 142*a* may not communicate with each other and thus the exhaust gas may not be smoothly exhausted even when the exhaust port is opened in a range in which the rotation angle of the crankshaft is 690° to 720° in the case of the comparative example in FIGS. 16 and 18, since the exhaust port is opened and thus the exhaust storage part 123*b*-1 and the exhaust hole 142*a* communicate with each other even in the range in which the rotation angle of the crankshaft is 690° to 720° in the case of the first embodiment in FIGS. 17 and 19, the exhaust storage part and the exhaust hole may communicate with each other in an entire angle section of the exhaust stroke. Accordingly, the exhaust gas may be relatively smoothly discharged.

Figure 20:
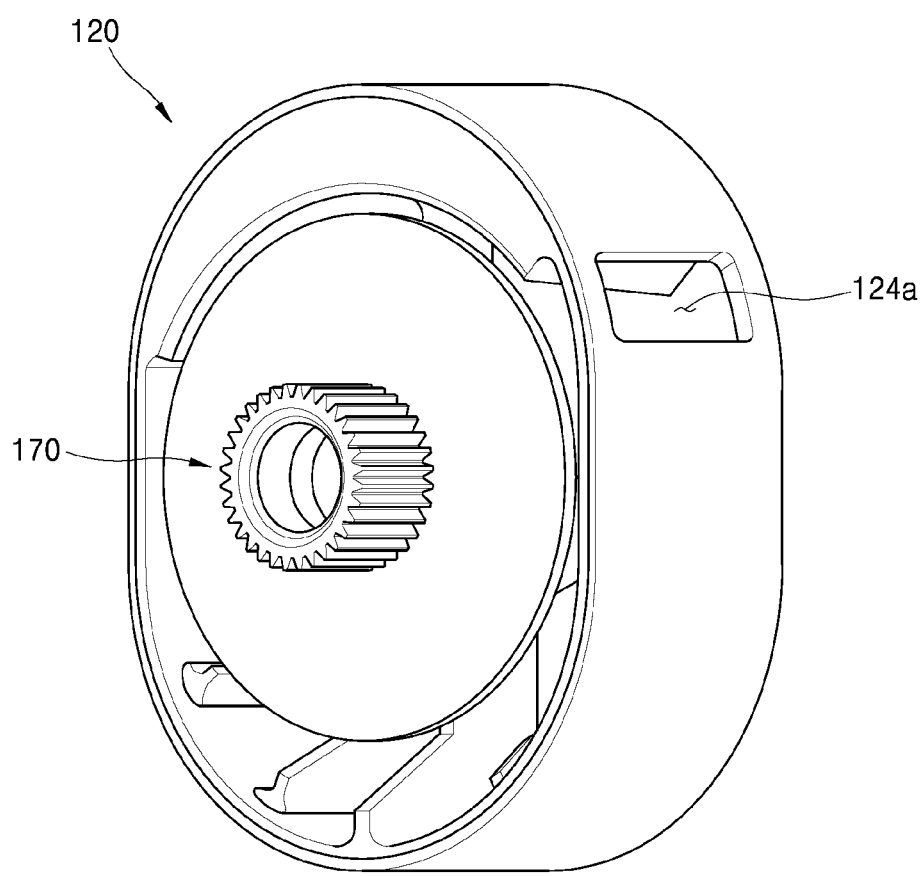
FIG. 20 is a perspective view illustrating an intake port of the rotor.
Figure 21:
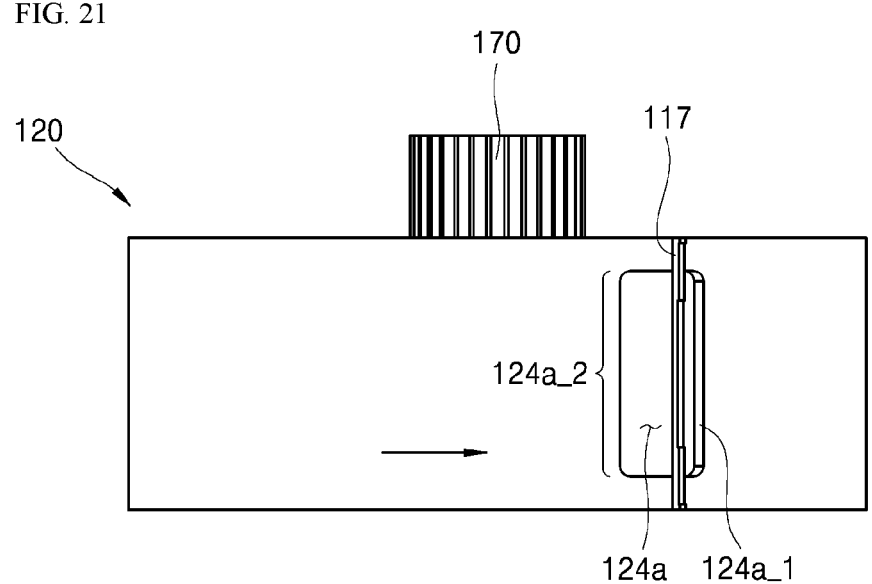
FIG. 21 is a view for describing contact between the intake port and an apex seal of the rotor when the rotor rotates in a counterclockwise direction.

FIG. 20 is a perspective view illustrating an intake port of the rotor, and FIG. 21 is a view for describing contact between the intake port and an apex seal of the rotor when the rotor rotates in the counterclockwise direction.

As shown in the drawing, the rotor 120 is provided with the intake port 124*a* in the sidewall. The intake port 124*a* passes through an apex seal 117 while the rotor rotates. As described above, the apex seal 117 receives an elastic force in a protruding direction to protrude toward and come into close contact with the rotor.

When the rotor 120 rotates in the counterclockwise direction, a right side surface of the intake port 124*a* passes through the apex seal 117 first, and then a left side surface of the intake port 124*a* passes through the apex seal 117.

However, since the intake port 124*a* is not supported after the apex seal 117 passes through a right side surface 124*a*_1 of the intake port, the apex seal 117 protrudes toward the inside of the intake port 124*a*. In this case, a protruding portion of the apex seal 117 interferes with stepped edge portions while passing through a left side surface 124*a*_2 of the intake port.

Since the stepped edge portions of the apex seal and the intake port collide in each cylinder whenever the rotor 120 rotates, both the rotor 120 and the apex seal 117 may be worn or damaged.

Figure 22:
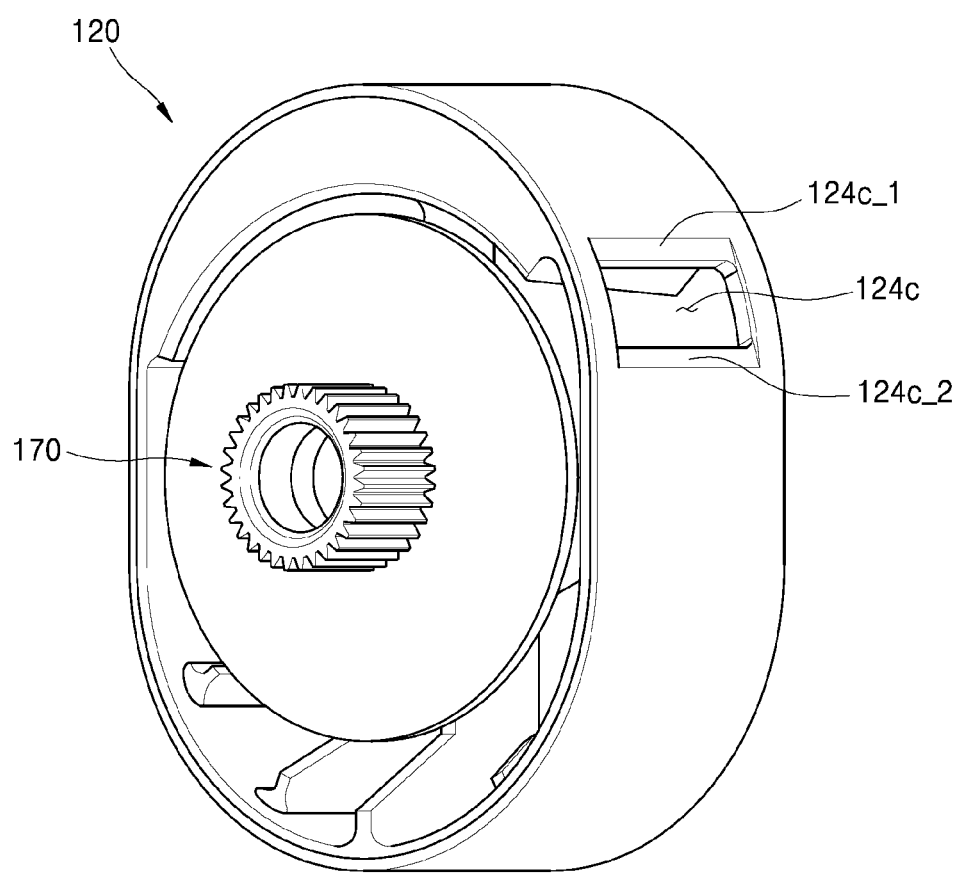
FIG. 22 is a perspective view illustrating an intake port of a rotor according to a second embodiment of the present invention.
Figure 23:
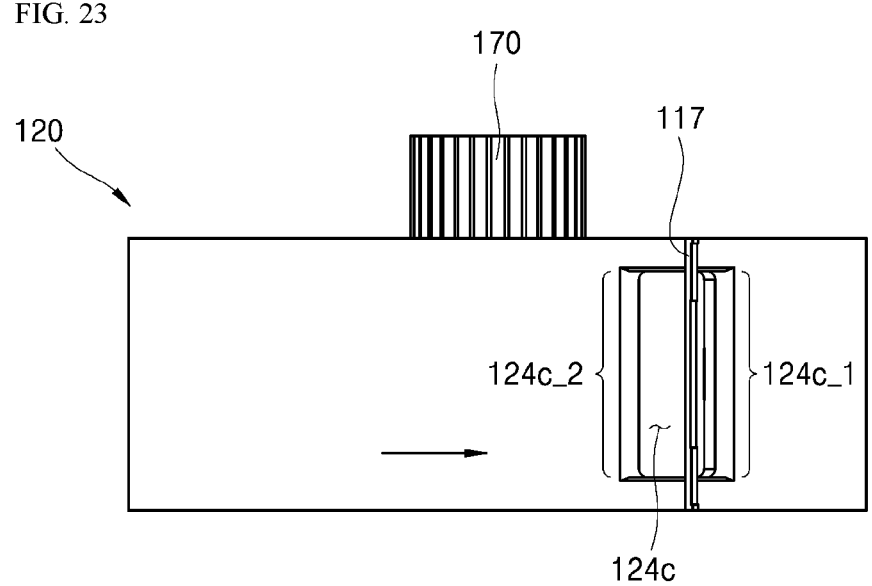
FIG. 23 is a view for describing contact between the intake port and the apex seal of the rotor when the rotor in FIG. 22 rotates in a counterclockwise direction.

FIG. 22 is a perspective view illustrating an intake port of a rotor according to a second embodiment of the present invention, and FIG. 23 is a view for describing contact between the intake port and an apex seal of the rotor when the rotor in FIG. 22 rotates in the counterclockwise direction.

As shown in the drawing, in the rotor according to the second embodiment of the present invention, an intake port 124*c* is provided with inclined surfaces 124*c*_1 and 124*c*_2 in surfaces formed in a direction parallel to the apex seal 117.

When the rotor 120 rotates in the counterclockwise direction, the apex seal 117 enters the intake port 124*c* by passing through the first surface 124*c*_1. When the rotor 120 passes through the first surface 124_1, the apex seal 117 which corresponds to the inside of the intake port 124*c* is not supported and is spaced apart, and thus may protrude into the intake port 124*c* due to an elastic force and thermal deformation. Further, when the apex seal 117 reaches the second surface 124*c*_2, the apex seal 117 protruding into the intake port 124*c* is supported by a side surface of the rotor from the second surface 124*c*_2.

The inclined surface formed in the first surface 124*c*_1 serves to support the apex seal 117 so that a protruding process of the apex seal 117 into the intake port 124*c* may be gradually performed.

The inclined surface formed in the second surface 124*c*_2 serves to allow a process in which the apex seal 117 escapes from the intake port 124*c* and is supported by an outer circumferential surface of the rotor 120 to be gradually performed.

In other words, in the second embodiment of the present invention, both surfaces of the intake port 124*c* are provided with the inclined surfaces 124*c*_1 and 124*c*_2 so that the protruding process of the apex seal and a process in which the apex seal is pushed back may be smoothly performed.

Since an actual problem that the apex seal and the port collide occurs when the apex seal passes through the second surface which escapes from the port, only the second surface among the first surface and the second surface may be provided with the inclined surface.

The above-described structure causes an effect in that abrasion and noise caused by interference with the sidewall of the rotor while the apex seal 117 passes through the intake port 124*c* are reduced.

Meanwhile, in the above-described embodiment, both surfaces 124*c*_1 and 124*c*_2 of the intake port 124*c* are shown as being parallel to the apex seal 117, but both surfaces 124*c*_1 and 124*c*_2 of the intake port 124*c* may have an inclination angle with the apex seal 117.

In other words, the intake port 124*c* may be formed in a parallelogram shape. The shape causes an effect in that contact between surfaces of the apex seal and the intake port 124*c* corresponding to each other may be gradually made from one side. In this case, the inclination angle may be in a range of 3° to 15°. When the inclination angle is smaller than 3°, the surfaces of the apex seal and the intake port 124*c* are almost parallel to each other and thus an effect of gradual contact is small, and when the inclination angle is greater than 15°, an opening area in the intake stroke is decreased and thus it is not preferable.

Figure 24:
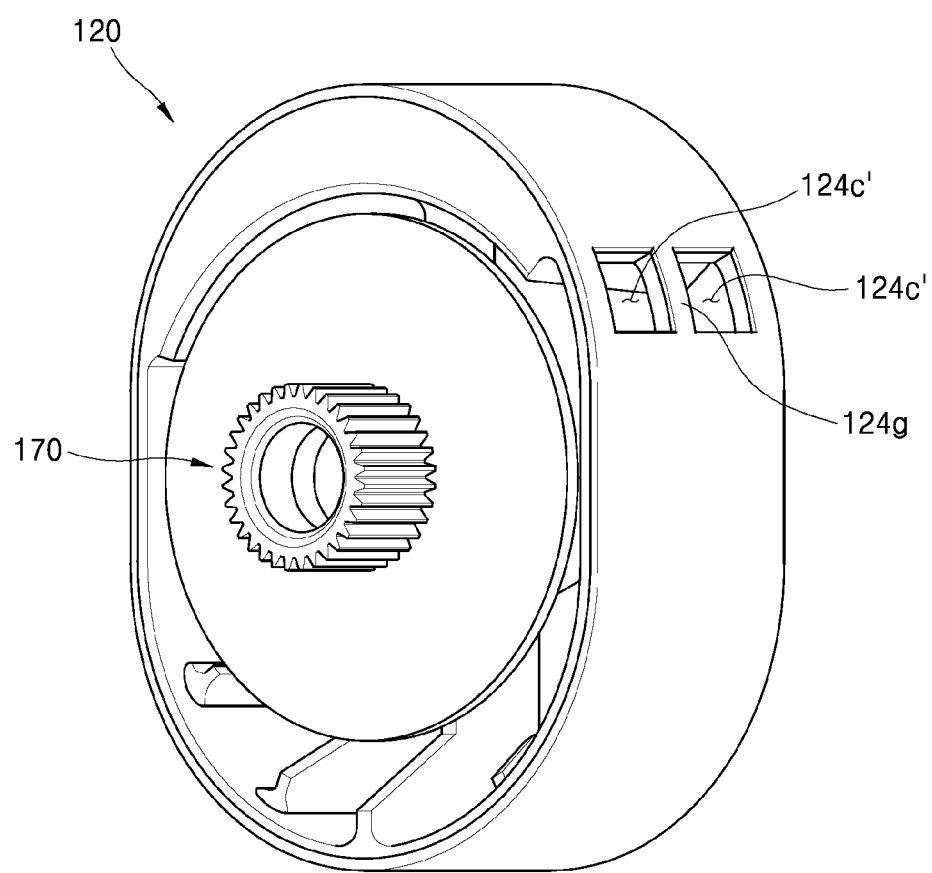
FIG. 24 is a perspective view illustrating an intake port of a rotor according to a third embodiment of the present invention.
Figure 25:
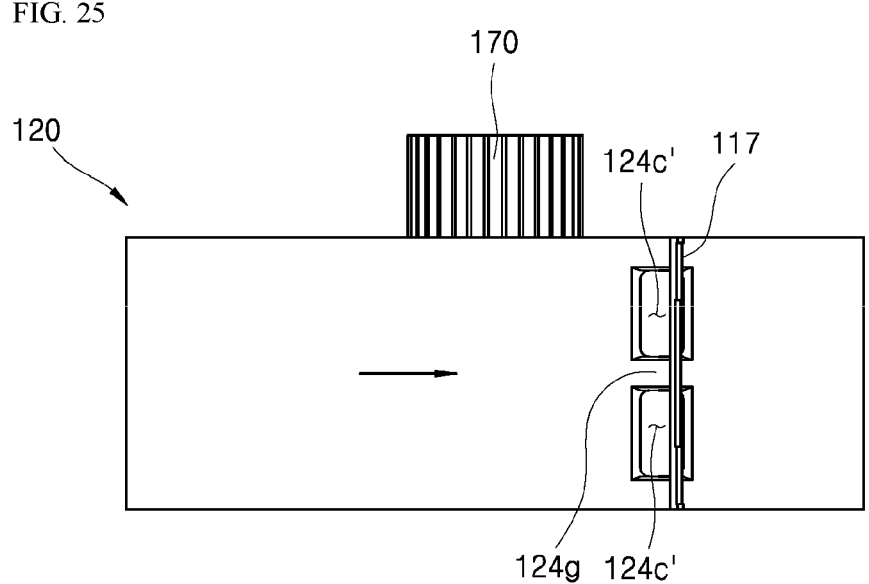
FIG. 25 is a view for describing contact between the intake port and an apex seal of the rotor when the rotor in FIG. 24 rotates in a counterclockwise direction.

FIG. 24 is a perspective view illustrating an intake port of a rotor according to a second embodiment of the present invention, and FIG. 25 is a view for describing contact between the intake port and an apex seal of the rotor when the rotor in FIG. 24 rotates in the counterclockwise direction.

In the third embodiment of the present invention, an intake port 124c' of the rotor 120 is provided with a guide surface 124g which divides the intake port 124c' in a thickness direction of the rotor.

The intake port 124c' formed in the side surface of the rotor 120 is formed to suction the mixed air by entering the stroke chamber according to the rotation of the crankshaft, and a position according to the rotation direction of the rotor is determined according to setting of an intake start angle and an intake end angle.

A size of the intake port 124c' in the thickness direction of the rotor 120 is not related to the intake start angle and the intake end angle.

Accordingly, generally, the size of the intake port 124c' in the thickness direction of the rotor is determined to be capable of maximally securing an opening area, and securing the rigidity of the rotor 120.

However, when the size of the intake port 124c' in the thickness direction of the rotor increases, a section protruding when the apex seal 117 passes through the intake port 124c' (a section placed in the intake port) is elongated, and accordingly, a protruding depth of the apex seal 117 into the intake port 124c' also increases.

In the embodiment, since the guide surface 124g is provided in the middle of the thickness direction of the intake port 124c', the apex seal 117 may be supported by the guide surface 124g while passing through the intake port 124c', and thus a length of the apex seal 117 which is not supported by the guide surface 124g is reduced.

When the apex seal 117 having a thin rod shape passes through the intake port 124c', since a center portion is supported by the guide surface 124g, an effect in that the protruding depth of the apex seal 117 into the intake port 124c' is reduced, and thus damage due to collision between side surfaces of the apex seal 117 and the intake port 124c' is reduced occurs.

Figure 26:
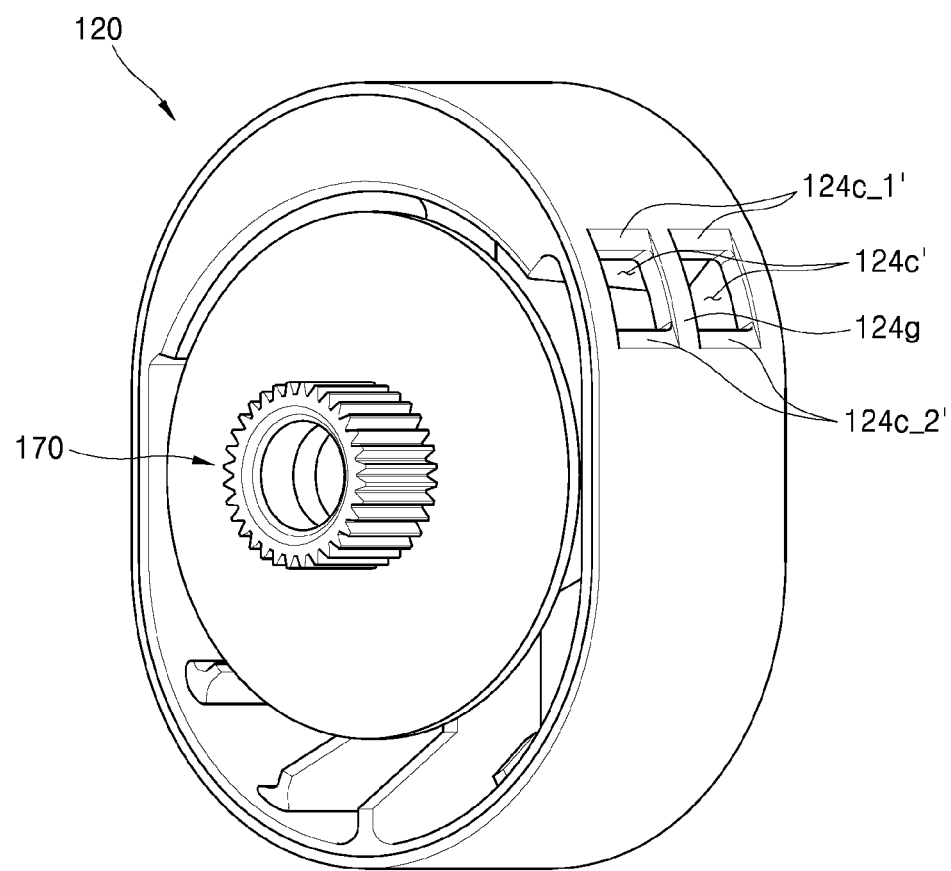
FIG. 26 is a perspective view illustrating an intake port of a rotor according to a fourth embodiment of the present invention.
Figure 27:
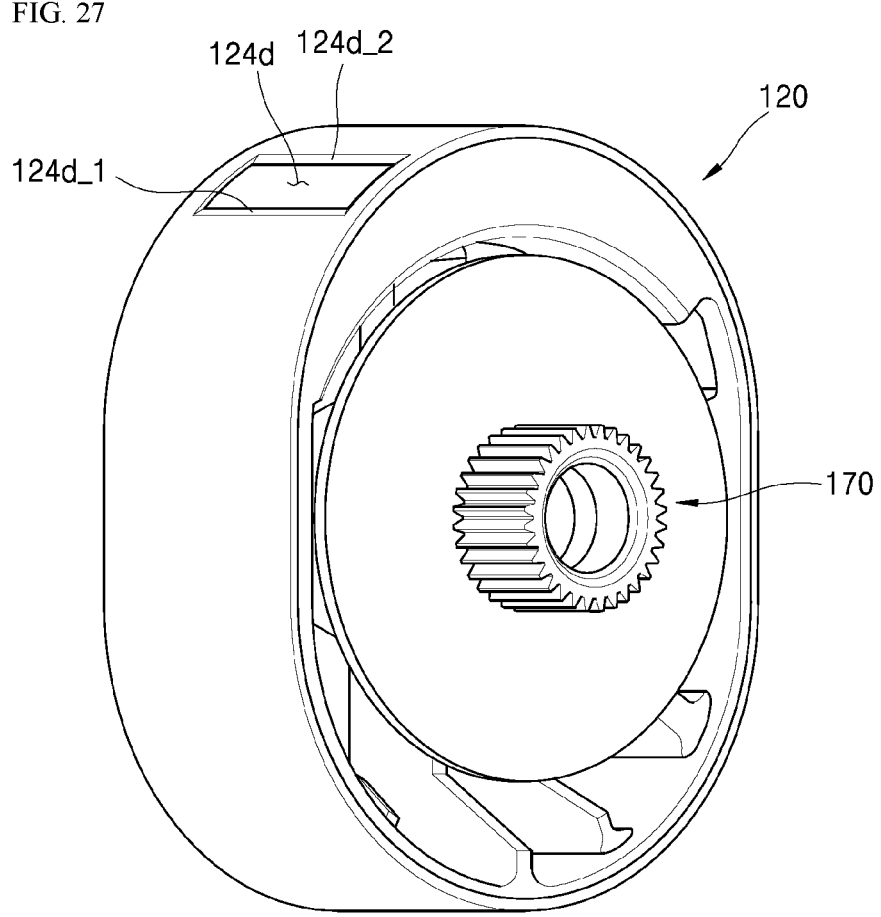
FIG. 27 is a perspective view illustrating an exhaust port of a rotor according to a fifth embodiment of the present invention.

FIG. 26 is a perspective view illustrating an intake port of a rotor according to a fourth embodiment of the present invention, and FIG. 27 is a perspective view illustrating an exhaust port of a rotor according to a fifth embodiment of the present invention.

First, referring to FIG. 26, the intake port 124c' of the rotor according to the third embodiment of the present invention is divided by the guide surface 124g, and provided with inclined surfaces in surfaces 124c_' and 124c_2' parallel to the apex seal. When both the inclined surface structure and the guide surface structure of the above-described second embodiment are applied, interference between the apex seal and the intake port may be further reduced.

FIG. 27 illustrates a state in which inclined surfaces are applied in both surfaces 124d_1 and 124d_2 of an exhaust port 124d of the rotor 120. In the case of the exhaust port 124d, like the above-described intake port, a structure of forming inclined surfaces or guide surfaces may be identically applied.

Figure 28:
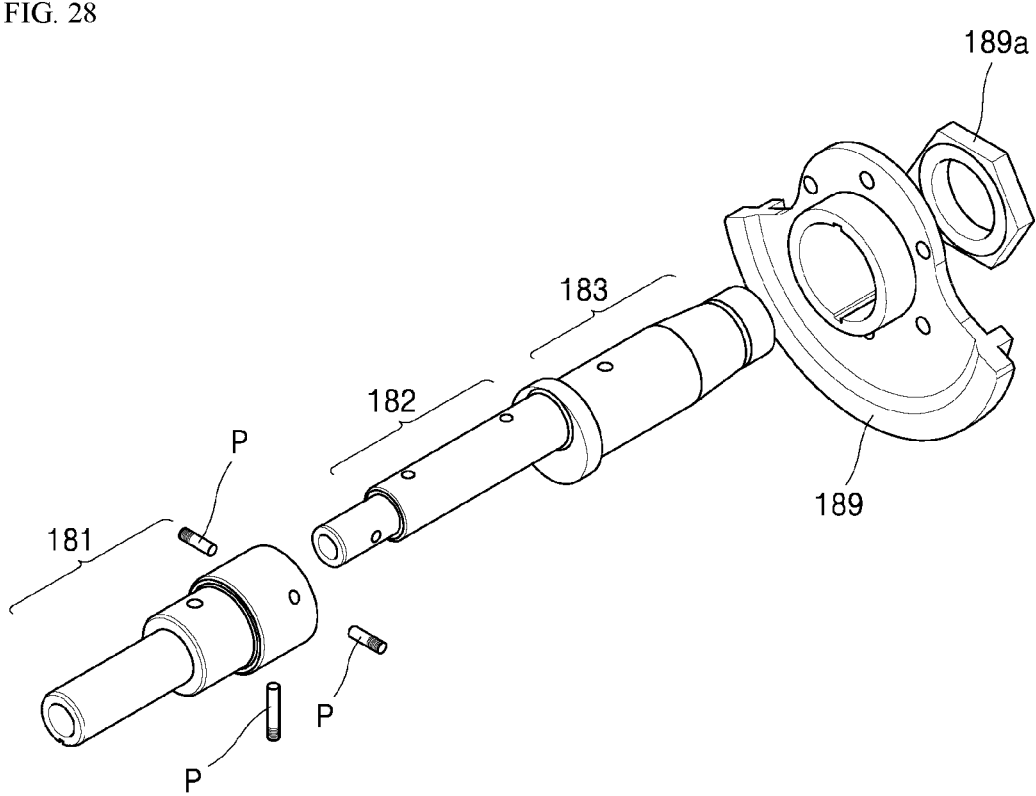
FIG. 28 is an exploded perspective view illustrating an example of a divided structure of a crankshaft.

FIG. 28 is an exploded perspective view illustrating an example of a divided structure of a crankshaft.

The crankshaft may be divided into three sections: a front surface journal part 181, an eccentric journal part 182, and a rear surface journal part 183. In order to assemble the rotor 120 and the rotor gear 170 to the eccentric journal part 182, the crankshaft should be divided at the eccentric journal part 182.

As shown in the drawing, in the crankshaft, the eccentric journal part 182 is coupled to the front surface journal part 181 by fastening pins P. The above-described structure smoothly operates in a low load region but a weight applied to the fastening pins P which are coupling components increases toward a high load region.

When an excessive weight is applied to the fastening pins P, the fastening pins P may be deformed or damaged, and thus the crankshaft may be undesirably disassembled. Even when the crankshaft is not disassembled, when the fastening pins P are deformed, the alignment between the front surface journal part 181 and the rear surface journal part 183 is distorted, and interference between the rotor 120 and the housing 110 may occur.

Meanwhile, a balance weight 189 is coupled to the rear of the rear surface journal part 183 through a fastening means 189a. The balance weight 189 serves to reduce vibration and noise during rotation by reducing the rotational inertia moment of the crankshaft.

Figure 29:
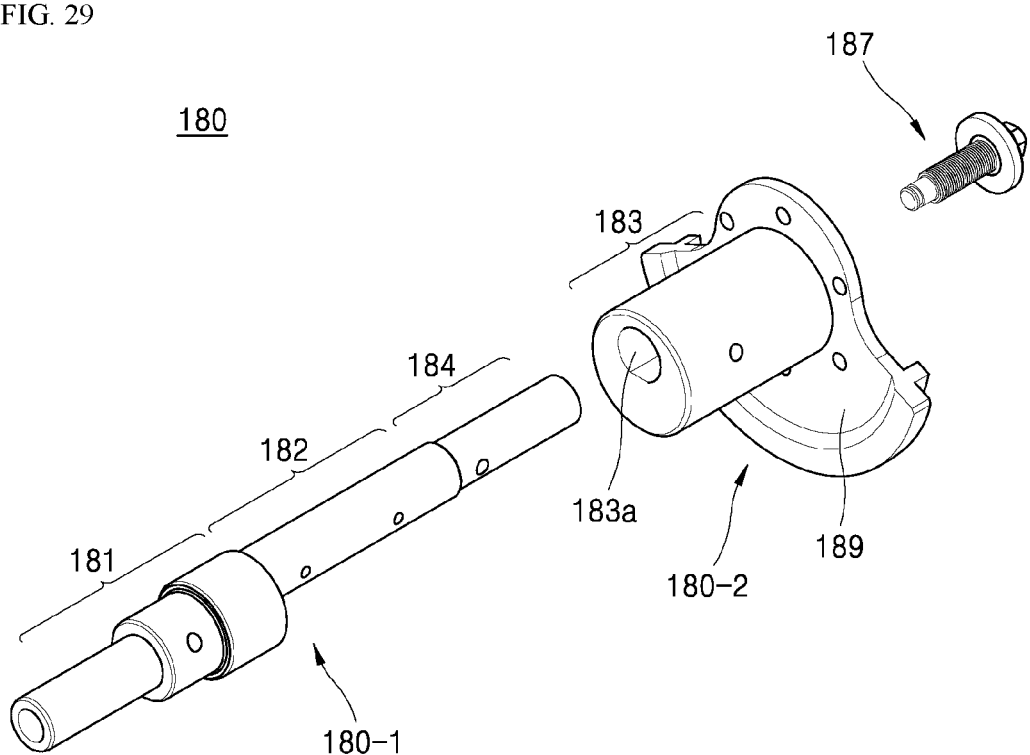
FIG. 29 is an exploded perspective view illustrating a divided structure of a crankshaft according to a sixth embodiment of the present invention.
Figure 30:
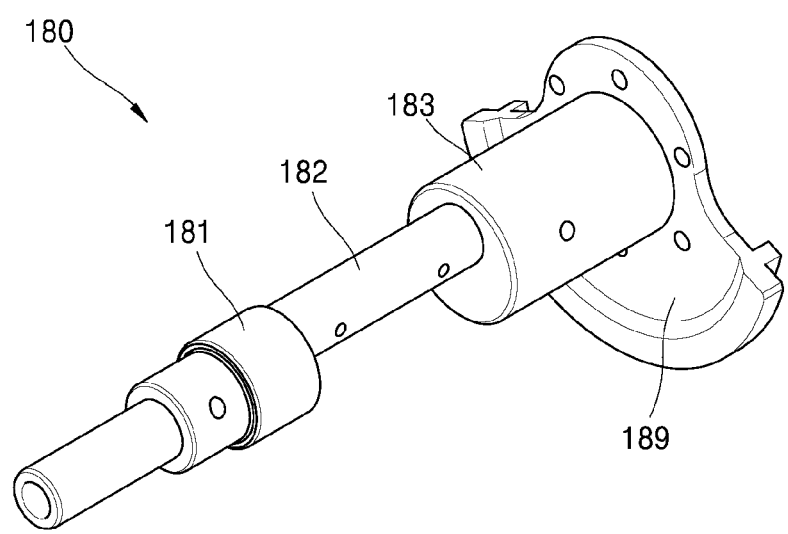
FIG. 30 is a perspective view illustrating a coupling state of the crankshaft according to the sixth embodiment of the present invention.
Figure 31:
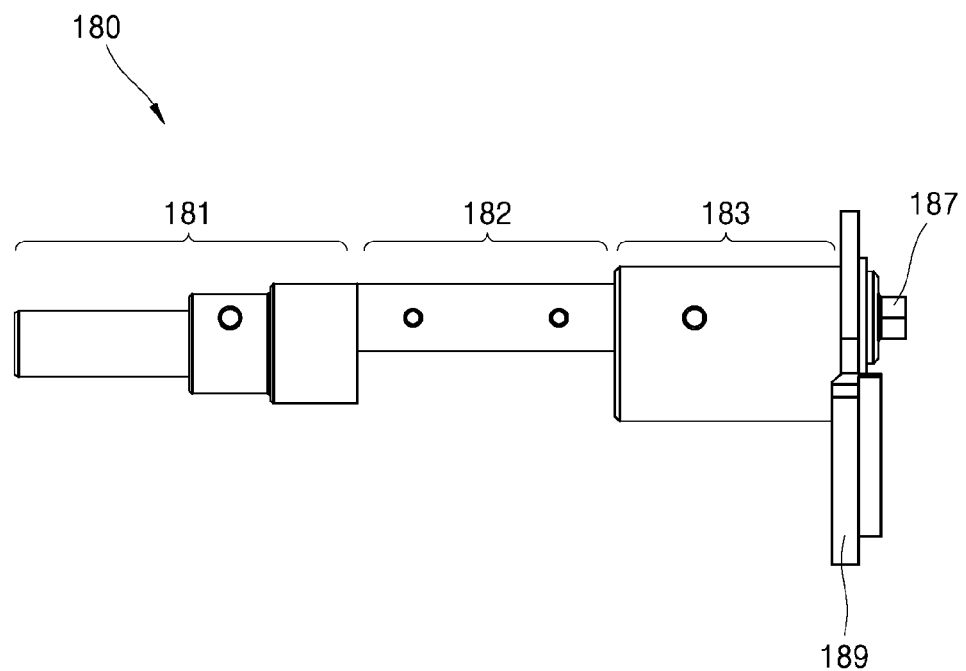
FIG. 31 is a side surface view illustrating the coupling state of the crankshaft according to the sixth embodiment of the present invention.

FIG. 29 is an exploded perspective view illustrating a divided structure of a crankshaft according to a sixth embodiment of the present invention, FIG. 30 is a perspective view illustrating a coupling state of the crankshaft according to the sixth embodiment of the present invention, and FIG. 31 is a side surface view illustrating the coupling state of the crankshaft according to the sixth embodiment of the present invention.

As described above, the divided structure of the crankshaft according to the sixth embodiment of the present invention includes a first crankshaft 180-1 including a front surface journal part 181 and an eccentric journal part 182, a second crankshaft 180-2 including a rear surface journal part 183 and a balance weight 189, and a fastening bolt 187 which couples the first crankshaft 180-1 and the second crankshaft 180-2.

The above-described divided structure in FIG. 28 has a structure in which seven components including two shaft components, three fastening bolts P, the balance weight 189, and the balance weight fastening means 189a are assembled.

However, the crankshaft of the embodiment provides a structure in which three components including two crankshafts 180-1 and 180-2 and one fastening bolt 187 are assembled. Of course, when an O ring 187b in FIG. 32 which will be described later is included in the number of components, the number of components becomes four.

Further, in the crankshaft according to the present invention, since the balance weight 189 and the rear surface journal part 183 are formed as a single component, the fastening means which separately fastens the balance weight 189 is not required.

Further, a structure in which an insertion section 184 which extends from the eccentric journal part 182 is inserted into a coupling groove 183a formed in the second crankshaft 180-2, and then the fastening bolt 187 passes through the second crankshaft 180-2 from a rear surface of the second crankshaft 180-2 to be fastened to the insertion section 184 is provided.

Accordingly, since the coupling strength between the first crankshaft 180-1 and the second crankshaft 180-2 may be improved, the crankshaft is not damaged even in a high load region.

Figure 32:
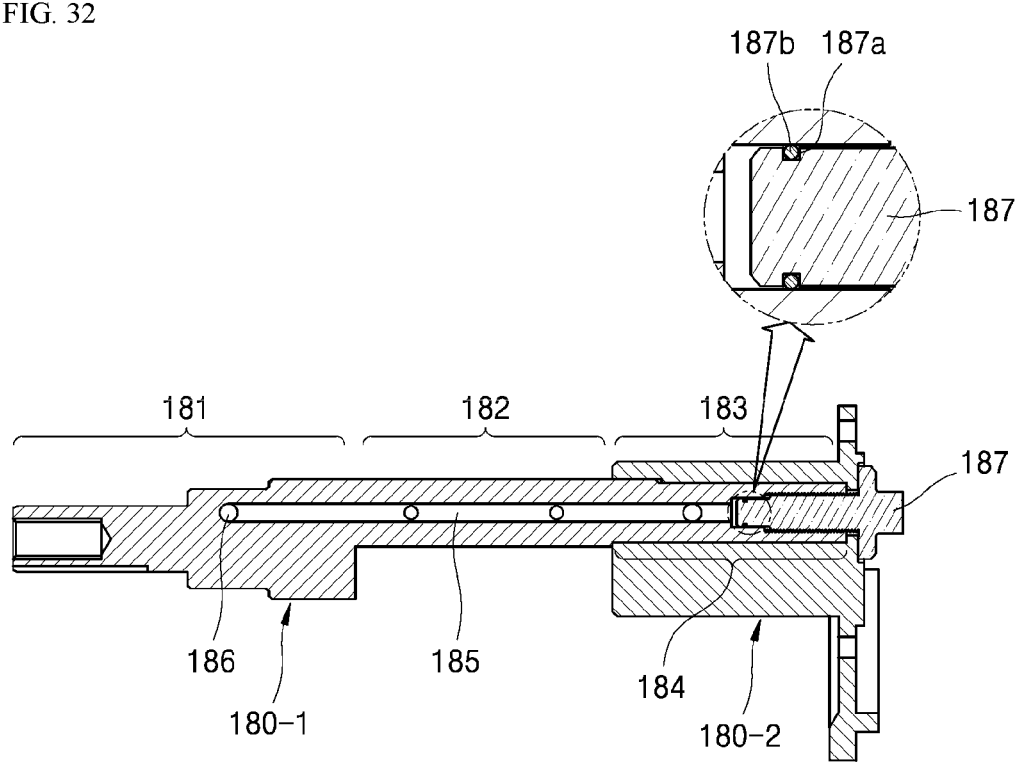
FIG. 32 is a cross-sectional view illustrating the coupling state of the crankshaft according to the sixth embodiment of the present invention.

FIG. 32 is a cross-sectional view illustrating the coupling state of the crankshaft according to the sixth embodiment of the present invention.

Referring FIG. 32, the first crankshaft 180-1 is provided with an oil flow path 185 which enters the eccentric journal part 182 and the front surface journal part 181 from a rear end of the insertion section 184. Discharge holes 186 which pass through outer circumferential surfaces of the journal parts 181, 182, and 183 are connected to the oil flow path 185. The above-described structure allows oil to be supplied to the journal parts through the oil flow path 185.

In this case, since the fastening bolt 187 closes an inlet of the oil flow path 185, the oil supplied to the oil flow path 185 may be prevented from leaking.

In the above-described structure, since the oil flow path may be processed together with the fastening hole, and the oil flow path is closed by the fastening bolt 187, assembly efforts are reduced. Further, leakage of the oil to the fastening bolt 187 side may be more reliably blocked by providing an O ring groove 187a in an end portion of the fastening bolt 187 and disposing the O ring 187b in the O ring groove 187a.

Figure 33:
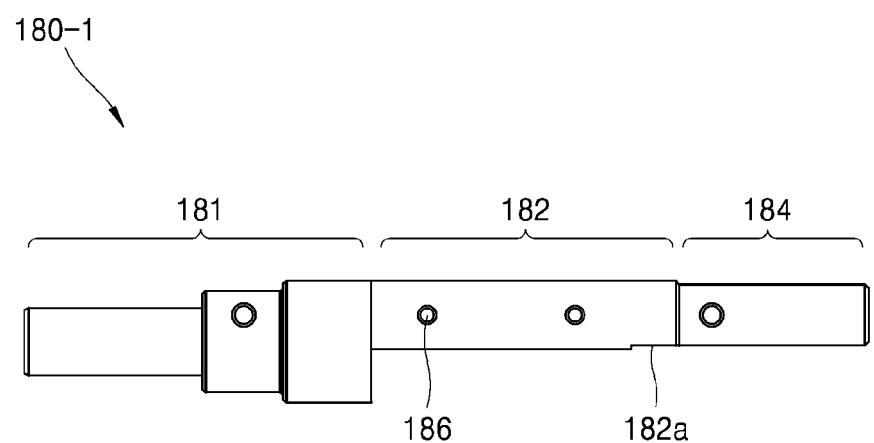
FIGS. 33 and 34 are a side surface view and a plan view illustrating a first crankshaft of the crankshaft according to the sixth embodiment of the present invention, respectively.
Figure 34:
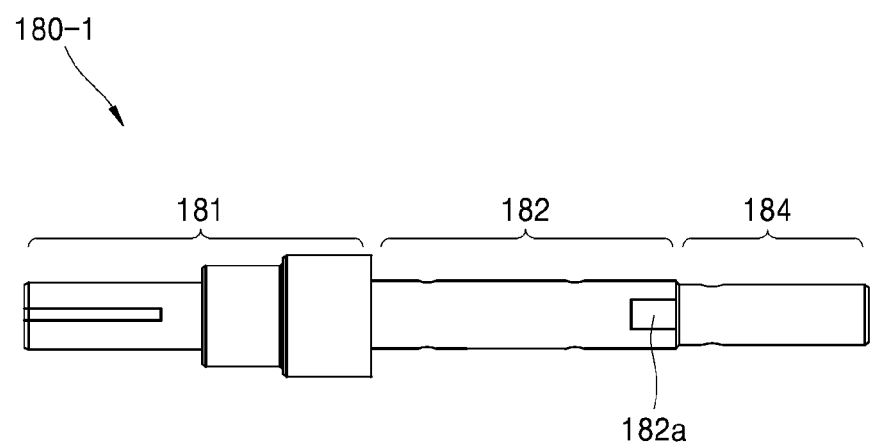

FIGS. 33 and 34 are a side surface view and a plan view illustrating a first crankshaft of the crankshaft according to the sixth embodiment of the present invention, respectively.

As shown in the drawing, a reference surface 182a may be provided in the insertion section 184 of the first crankshaft 180-1. The reference surface 182a may have a D-cut shape like the above-described embodiment.

The fastening groove 183a of the second crankshaft 180-2 into which the insertion section 184 of the first crankshaft 180-1 is inserted is provided with a reference surface (not shown) corresponding to the reference surface 182a. In the above-described structure, since the reference surfaces come into surface contact with each other when the first crankshaft 180-1 and the second crankshaft 180-2 are assembled, a coupling direction of the first crankshaft 180-1 and the second crankshaft 180-2 may be constrained.

The reference surfaces may each have a curved surface shape rather than a flat surface shape. Each of the reference surfaces is satisfactory when having a shape capable of asymmetrically constraining directivity of coupling with the other surface.

Figure 35:
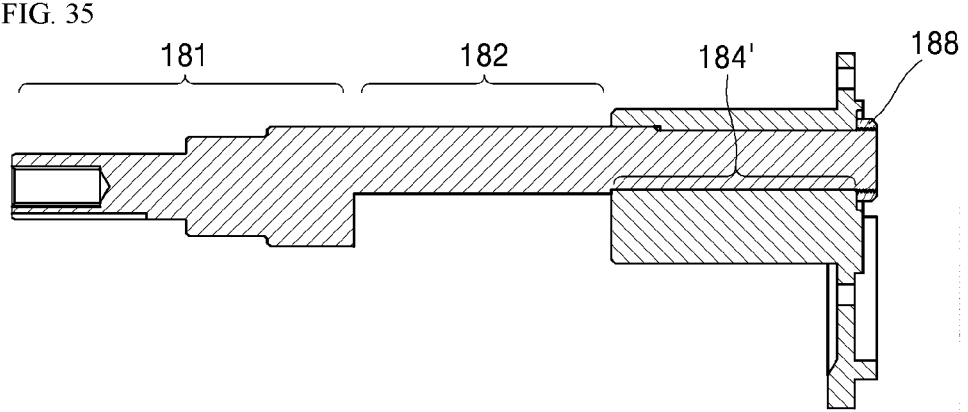
FIG. 35 is an exploded perspective view illustrating a divided structure of a crankshaft according to a seventh embodiment of the present invention.

FIG. 35 is an exploded perspective view illustrating a divided structure of a crankshaft according to a seventh embodiment of the present invention.

In the embodiment, an insertion section 184' of a first crankshaft is coupled through a through hole of the second crankshaft.

As shown in the drawing, the insertion section 184' exposed at a rear of the second crankshaft may be fastened with a fastening nut 188 to be coupled.

The above-descriptions are only the embodiments for the rotary engine according to the present invention, and the present invention is not limited to the above-described embodiments, and as claimed in the following claims, the technical spirit of the present invention is present up to the scope modifiable by those skilled in the art in the scope without departing from the principle of the present invention.

The invention claimed is:

1. A rotary engine comprising:
a housing including three lobe accommodation parts;
a rotor configured to eccentrically rotate about a center of the housing and including:
two lobes configured to be received in the lobe accommodation parts,
an intake port defined at a first side,
an exhaust port defined at a second side,
an intake storage part that fluidly communicates with the intake port, and
an exhaust storage part that fluidly communicates with the exhaust port;
an intake-side housing cover that is connected to a first portion of the housing and that overlaps the lobe accommodation parts, the intake-side housing cover including an intake hole configured to fluidly communicate with the intake storage part of the rotor;
an exhaust-side housing cover that is connected to a second portion of the housing and that overlaps the lobe accommodation parts, the exhaust-side housing cover including an exhaust hole configured to fluidly communicate with the exhaust storage part of the rotor; and
a crankshaft that is supported by the intake-side housing cover and the exhaust-side housing cover and that is connected to the rotor,
wherein the exhaust storage part of the rotor is configured to be blocked from fluidly communicating with the exhaust hole of the exhaust-side housing cover during a part of an intake stroke in which the exhaust port of the rotor is opened.

2. The rotary engine of claim 1, wherein:
the intake stroke is performed based on a rotation angle of the crankshaft being from 0°±5° to 240°±5°; and
the exhaust port is opened based on the rotation angle of the crankshaft being from 0°±5° to 90°±5°.

3. The rotary engine of claim 2, wherein the exhaust storage part of the rotor is configured to be spaced apart from the exhaust hole of the exhaust-side housing cover based on the rotation angle of the crankshaft being from 0°±5° to 60°±5°.

4. The rotary engine of claim 1, wherein the exhaust storage part of the rotor is configured to remain in fluid communication with the exhaust hole of the exhaust-side housing cover until an exhaust stroke ends.

5. The rotary engine of claim 4, wherein:
the exhaust stroke is performed based on the rotation angle of the crankshaft being from 540°±5° to 720°±5°; and
the exhaust port is opened during the exhaust stroke.

6. The rotary engine of claim 5, wherein the exhaust storage part of the rotor is configured to remain in fluid communication with the exhaust hole of the exhaust-side housing cover during an entire angle section of the entire exhaust stroke.

7. A rotary engine comprising:
a housing including a first number of lobe accommodation parts, the first number being equal to or greater than three;
a rotor configured to eccentrically rotate around a center of the housing and including:
a second number of lobes configured to be received in the lobe accommodation parts, the second number being one less than the first number,
an intake port defined at a first side,
an exhaust port defined at a second side,
an intake storage part configured to that fluidly communicates with the intake port,
an exhaust storage part that fluidly communicates with the exhaust port;
an intake-side housing cover that is connected to a first portion of the housing and that overlaps the lobe accommodation parts, the intake-side housing cover including an intake hole configured to fluidly communicate with the intake storage part of the rotor;

an exhaust-side housing cover that is connected to a second portion of the housing and that overlaps the lobe accommodation parts, the exhaust-side housing cover including an exhaust hole configured to fluidly communicate with the exhaust storage part of the rotor; and a crankshaft that is supported by the intake-side housing cover and the exhaust-side housing cover and that is connected to the rotor, wherein the exhaust storage part of the rotor is configured to be blocked from fluidly communicating with the exhaust hole of the exhaust-side housing cover during a part of a stroke in which the exhaust port of the rotor is opened.

8. The rotary engine of claim 7, wherein the exhaust storage part of the rotor includes a section that overlaps with the intake port.

9. The rotary engine of claim 7, further comprising:
an apex seal disposed at an innermost peak of at least one of the lobe accommodation parts and configured to make contact with an outer surface of the rotor; and
a guide surface that divides the intake port or the exhaust port in a circumferential direction of the rotor and is configured to support the apex seal that passes the intake port or the exhaust port.

10. The rotary engine of claim 7, further comprising:
an apex seal disposed at an innermost peak of at least one of the lobe accommodation parts and configured to make contact with an outer surface of the rotor,
wherein at least one of the intake port or the exhaust port includes a guide surface configured to support the apex seal that passes the intake port or the exhaust port.

11. The rotary engine of claim 10, wherein the guide surface is disposed to divide the at least one of the intake port or the exhaust port into multiple sub-ports.

12. The rotary engine of claim 10, wherein the at least one of the intake port or the exhaust port includes an inclined surface that is parallel to the apex seal.

13. The rotary engine of claim 7, wherein the crankshaft includes:
a first crankshaft including a single component with a front surface journal part and an eccentric journal part, the front surface journal part being supported by the intake-side housing cover and the eccentric journal part being connected to the rotor; and
a second crankshaft including a single component with a rear surface journal part and a balance weight, the rear surface journal part being connected to the first crankshaft and supported by the exhaust-side housing cover.

14. The rotary engine of claim 13, wherein:
the first crankshaft includes an insertion section that is inserted into the second crankshaft; and
the second crankshaft includes a coupling groove configured to receive the insertion section.

15. The rotary engine of claim 14, comprising:
a fastening hole extending through the insertion section of the first crankshaft and wall of the coupling groove of the second crankshaft; and
a fastening bolt that is fastened to the insertion section and the coupling groove through the fastening hole.

16. The rotary engine of claim 15, wherein:
the first crankshaft includes an oil flow path that extends from an end of the insertion section and is routed through the insertion section into the front surface journal part; and
the end of the insertion section is closed by the fastening bolt.

17. The rotary engine of claim 16, wherein an O-ring is disposed between the fastening bolt and the fastening hole.

18. The rotary engine of claim 14, wherein the insertion section and the coupling groove include reference surfaces configured to make surface contact with each other and orient the insertion section relative to the coupling groove as the insertion section is inserted into the coupling groove.

19. The rotary engine of claim 13, wherein:
the second crankshaft includes a through-hole, and
the first crankshaft includes an insertion section that is inserted into the through hole of the second crankshaft.

20. The rotary engine of claim 19, wherein a fastening nut is fastened to a portion of the insertion section that is exposed from the second crankshaft.

21. The rotary engine of claim 19, wherein the insertion section and the through hole include reference surfaces configured to make surface contact with each other and orient the insertion section relative to the through hole as the insertion section is inserted into the through hole.

* * * * *